(12) United States Patent
Phan et al.

(10) Patent No.: US 8,592,501 B2
(45) Date of Patent: Nov. 26, 2013

(54) FLOOR COVERING COMPOSITION CONTAINING RENEWABLE POLYMER

(75) Inventors: Tam T. Phan, Salem, NJ (US); Hao A. Chen, Salem, NJ (US); Dennis Bradway, Salem, NJ (US)

(73) Assignee: Mannington Mills, Inc., Salem, NJ (US)

(*) Notice: Subject to any disclaimer, the term of this patent is extended or adjusted under 35 U.S.C. 154(b) by 346 days.

(21) Appl. No.: 13/152,428

(22) Filed: Jun. 3, 2011

(65) Prior Publication Data

US 2011/0305886 A1    Dec. 15, 2011

Related U.S. Application Data

(60) Provisional application No. 61/352,884, filed on Jun. 9, 2010.

(51) Int. Cl.
*E04F 15/00* (2006.01)

(52) U.S. Cl.
USPC ............ 523/122; 428/201; 428/521; 428/413; 428/480; 428/426; 524/505; 524/427; 524/423

(58) Field of Classification Search
USPC ........................................................ 523/122
See application file for complete search history.

(56) References Cited

U.S. PATENT DOCUMENTS

| | | |
|---|---|---|
| 3,870,591 A | 3/1975 | Witman |
| 4,172,169 A | 10/1979 | Mawson et al. |
| 4,187,131 A | 2/1980 | Shortway et al. |
| 4,313,866 A | 2/1982 | Renshaw |
| 4,423,178 A | 12/1983 | Renshaw |
| 4,548,993 A | 10/1985 | Garagnani et al. |
| 4,614,680 A | 9/1986 | Fry et al. |
| 5,095,054 A | 3/1992 | Lay et al. |
| 5,112,671 A | 5/1992 | Diamond et al. |
| 5,212,246 A | 5/1993 | Ogale |
| 5,244,942 A | 9/1993 | Hover et al. |
| 5,286,564 A | 2/1994 | Cecchin et al. |
| 5,302,454 A | 4/1994 | Cecchin et al. |
| 5,380,794 A | 1/1995 | Schaefer et al. |
| 5,411,994 A | 5/1995 | Galli et al. |
| 5,446,078 A | 8/1995 | Vaidya et al. |
| 5,494,707 A | 2/1996 | Wang et al. |
| 5,700,865 A | 12/1997 | Lundquist |
| 5,824,727 A | 10/1998 | Blomkvist et al. |
| 5,955,521 A | 9/1999 | Rufus et al. |
| 5,955,547 A | 9/1999 | Roberts et al. |
| 5,961,903 A | 10/1999 | Eby et al. |
| 6,046,265 A | 4/2000 | Clark et al. |

(Continued)

FOREIGN PATENT DOCUMENTS

WO    03/051981 A1    6/2003

OTHER PUBLICATIONS

PSM (HK) Company Limited, "New ecological environment materials," (no date) (24 pages).

(Continued)

*Primary Examiner* — Mark Ruthkosky
*Assistant Examiner* — Ian Rummel
(74) *Attorney, Agent, or Firm* — Kilyk & Bowersox, P.L.L.C.

(57) ABSTRACT

A composition is described that includes at least one polyolefin, at least one thermoplastic bio-resin derived from starch or soy or both, and at least one compatibilizer having at least one polyolefin and at least one polar group. Surface coverings and floor coverings, such as laminated floor coverings, having the composition, are also described.

41 Claims, 1 Drawing Sheet

METHOD FOR PRODUCING VARIEGATED CHIPS & SHEET THEREOF

(56) References Cited

U.S. PATENT DOCUMENTS

| | | |
|---|---|---|
| 6,046,279 A | 4/2000 | Roberts et al. |
| 6,114,008 A | 9/2000 | Eby et al. |
| 6,218,001 B1 | 4/2001 | Chen et al. |
| 6,228,463 B1 | 5/2001 | Chen et al. |
| 6,291,078 B1 | 9/2001 | Chen et al. |
| 6,555,216 B2 | 4/2003 | Chen et al. |
| 6,605,657 B1 | 8/2003 | Favis et al. |
| 6,844,380 B2 | 1/2005 | Favis et al. |
| 6,869,985 B2 | 3/2005 | Mohanty et al. |
| 6,986,934 B2 | 1/2006 | Chen et al. |
| 2003/0119949 A1 | 6/2003 | Favis et al. |
| 2005/0123744 A1 | 6/2005 | Mohanty et al. |
| 2005/0136259 A1 | 6/2005 | Mohanty et al. |
| 2005/0192377 A1 | 9/2005 | Scheer et al. |
| 2007/0021566 A1 | 1/2007 | Tse et al. |
| 2007/0116737 A1 | 5/2007 | Favis et al. |
| 2007/0129467 A1 | 6/2007 | Scheer |
| 2007/0138439 A1 | 6/2007 | Asmus et al. |
| 2007/0203283 A1 | 8/2007 | Scheer |
| 2008/0081875 A1 | 4/2008 | Tian et al. |
| 2008/0081882 A1 | 4/2008 | Tian et al. |
| 2008/0081898 A1 | 4/2008 | Ross et al. |
| 2008/0206583 A1 | 8/2008 | Phan et al. |
| 2008/0233336 A1 | 9/2008 | Giannopoulos et al. |
| 2008/0249212 A1 | 10/2008 | Sigworth et al. |

OTHER PUBLICATIONS

Wuhan Huali Environment Protection Science & Technology Co., Ltd., "PSM New Ecological Environment Materials," (no date) (9 pages).

Notification of Transmittal of the International Search Report and the Written Opinion of the International Searching Authority issued in corresponding International Patent Application No. PCT/US2011/039008 dated Feb. 29, 2012 (11 pages).

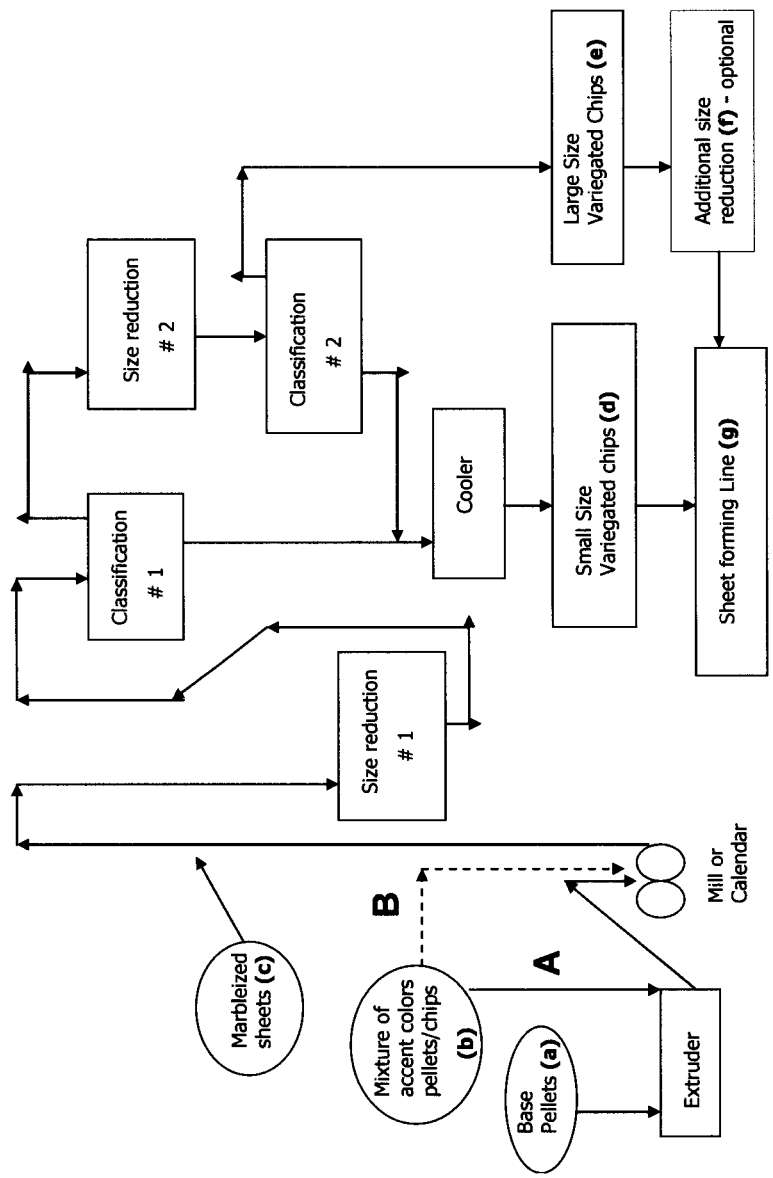

FLOOR COVERING COMPOSITION CONTAINING RENEWABLE POLYMER

This application claims the benefit under 35 U.S.C. §119 (e) of prior U.S. Provisional Patent Application No. 61/352,884, filed Jun. 9, 2010, which is incorporated in its entirety by reference herein.

The present invention relates to olefin based compositions. In particular, the present invention relates to compositions comprising one or more polyolefins, at least one thermoplastic bio-resin derived from starch, and at least one polyolefin modified or functionalized by at least one polar group, and further relates to halogen-free forms of such compositions. The present invention further relates to surface coverings containing the olefin based composition, such as halogenated-free surface coverings containing such a composition, and to methods of making the compositions, flooring coverings, and laminated surface coverings.

Certain polyolefins have been used for surface coverings. Conventional polyolefins were found to mix poorly with fillers, particularly when the filler loading is greater than 50 wt % of the compositions. As a result, the costs of polyolefin products were not competitive with PVC products. Moreover, the adhesion of the polyolefin to other components can be poor.

The blending of starch with certain olefin polymers, such as polyethylene and polypropylene, has been the subject of increasing interest over recent years, since starch is renewable and an inexpensive material. Moreover, starch may also impart partial biodegradability to the resulting blend.

Natural starch found in plant products can be isolated as a granular powder. It is known that natural starch can be treated at elevated temperature and pressure with addition of defined amounts of water to form a melt. Such a melt can be mixed with additives such as plasticizers to obtain a thermoplastic starch or TPS. These forms of starch can be mixed with synthetic polymers and co-polymers. For example, U.S. Pat. No. 5,095,054 describes such a process.

Difficulties have arisen in that the presence of starch has had a negative impact on the physical properties of the resulting mixture when compared to the pure synthetic polymers including brittleness and stiffness.

Accordingly, there is a need to provide an alternative to PVC compositions for surface coverings, by using a compatible blend of starch and olefin polymers, such as a blend of starch and olefin polymers having superior physical properties.

Further, there is a need to provide an olefin/bio-resin based composition that can be processed into a floor covering product for lighter weight as compared to PVC flooring.

Further, there is a need to provide an olefin based composition that would result in better LEED credit (Leadership in Energy and Environmental Design). Under the LEED scoring system, floor covering can be credited to points if it contains 10 wt % or more of post-industrial recycle material and/or 5 wt % or more of rapid renewable materials. Such compositions are given preference as "greener" products than compositions containing no recycle or no renewable materials at all. Thus, the use of rapidly renewable materials for building material in general and for floor covering specifically is of high interest.

Further, there is a need to provide a composition for a floor covering that is environmentally preferable, such as one that is non-halogenated, contains no phthalate plasticizer and/or no heavy metals, and/or is recyclable.

Further, there is a need to provide a floor covering that has superior physical properties, for example, a floor covering having higher breaking strength, better impact resistance, better tear resistance, better resistance to high static load and wear, and/or requiring less maintenance, than conventional PVC or polyolefin surface coverings while overcoming all of the disadvantages as described above.

SUMMARY OF THE INVENTION

A feature of the present invention is to provide a non-PVC surface covering made from a composition containing a compatible blend of at least one olefin polymer and at least one thermoplastic bio-resin derived from starch (TPS) and/or other sources. In particular, a feature of the present invention is to provide a composition having optimum physical properties, in which the olefin polymer and the thermoplastic bio-resin derived from starch and/or other sources are melted and homogenized together. The composition for a surface covering or portion thereof can comprise:

(A) At least one ethylene propylene copolymer having a melt flow rate (MFR) of from 0.5 to 15 g/10 min., for instance, obtainable by Ziegler Natta sequential polymerization. The total content of copolymerized ethylene can be from 20 to 60 wt %, having a melting point of from 140° C. to 160° C., a flexural modulus of from 20 Mpa to 500 Mpa and/or a density of from 0.870 to 0.900 g/cm$^3$, (B) At least one thermoplastic bio-resin derived from starch (e.g., corn starch) and/or other sources such as soy (e.g., soy meal and/or soy flour). The bio-resin can have a softening temperature of 125° C., a melting temperature of 156° C., a density of from 1.12 to 1.3 g/cm$^3$, and/or a melt flow rate of 0.5 to 2.0 g/10 min., (C) At least one compatibilizer made from functionalizing polyolefin with a polar group of carboxylic acid, or maleic anhydride, or acrylic acid, or ethylene methacrylic acid, or methyl acrylate, where the polar group can be present in the range of from 0.1 to 10 wt % of the polyolefin, and the polyolefin having an isotactic index of from 85% to 95% and the functionalizing polyolefin having a melt flow rate range of from 100-450 g/10 min., (D) At least one styrenic thermoplastic block copolymer of styrene/ethylene/butylene or styrene/ethylene/propylene, where the polystyrene content in the block copolymer can be from 7 to 30 wt % in the copolymer, and the block copolymer having a melt flow rate of from 2.5 to 25 g/10 min., (E) At least one filler, (F) At least one dispersion agent, such as one made from isotactic polypropylene homopolymer by either free radical degradation in peroxide or an isotactic polypropylene homopolymer made by single site catalyst polymerization, having an isotactic index great than 80 and a MFR from 1000 to 2000 g/10 min., (G) Optionally, a hydrocarbon tackifier comprises a blend of an aliphatic hydrocarbon resin, an aromatic hydrocarbon polymer functionalized with fatty acid ester having a softening temperature at 103° C. to 113° C., and (H) Optionally, an ethylene octene copolymer, such as one produced by a single site catalyst having a MFR from 3 to 30 g/10 min., a melting temperature from 60° C. to 90° C. and a density from 0.860 to 0.902 g/cm$^3$. The ethylene octene copolymer can, at least in part, replace component (A).

A feature of the present invention is to provide an alternative to PVC surface coverings. In particular, a feature of the present invention is to provide a composition for a floor covering that is environmentally preferable, such as one that is non-halogenated and/or does not contain a phthalate plasticizer.

Another feature of the present invention is to provide a composition for a floor covering that does not contain toxic compounds or does not generate dioxins when burned.

Another feature of the present invention is to provide a composition for a floor covering which contains a thermoplastic bio-resin obtained from a non-genetically modified renewable source, such as corn and/or soy.

Another feature of the present invention is to provide a composition for a floor covering that contains less petro-based polymers than conventional PVC or polyolefin surface coverings.

Another feature of the present invention is to provide surface and floor coverings that have better performance than conventional PVC or polyolefin surface coverings, such as better impact resistance, crack resistance, better tear resistance, better resistance to heat and light, better resistance to wear, and better resistance to high static load, and/or low maintenance, such as eliminating or decreasing the need for applying a finish.

Another unique feature of this invention is providing flooring material that has lower smoke and lower carbon monoxide gas generation when burned than conventional PVC or polyolefin floor covering material.

Yet another feature of this invention is providing flooring material that, at either a similar thickness or at a reduced thickness to a PVC product, has better performance and/or is lighter in weight than the PVC product, thus reducing the consumption or dependency on the natural gas usages in producing the petroleum based polymers used for surface coverings. Consequently, this will have a positive impact on the product life cycle cost and the environment due to the savings in transportation and packaging costs.

Another feature of this invention is a method for making a polyolefin surface covering comprising blends as described in this invention to produce variegated chips where several minor accent, contrasting color components inter-mixed with a major but plain color base component is used to form a visual product having a random order, multi-colored pattern.

One more feature of this invention is the development of surface coverings that can be recycled as well as utilize high amounts of post consumer and post industrial waste in the formula to benefit the environment. Another feature of this invention is to produce surface coverings with superior surface properties that allow for a simplified maintenance procedure as well as to reduce the maintenance cost thus resulting in a lower life cycle cost for the product.

Additional features and advantages of the present invention will be set forth in the description which follows, and, in part, will be apparent from the description, or may be learned by practice of the present invention. The features and other advantages of the present invention will be realized and attained by means of the elements and combinations particularly pointed out in the written description and the claims.

The present invention relates to surface coverings having the olefin based composition of the present invention.

The present invention also relates to methods of making the compositions and surface coverings, according to the present invention.

It is to be understood that both the foregoing general description and the following detailed description are exemplary and explanatory only and are intended to provide a further explanation of the present invention, as claimed.

BRIEF DESCRIPTION OF THE DRAWING

FIG. 1 is a flow chart setting forth a method(s) for making resilient floor coverings.

DETAILED DESCRIPTION OF THE PRESENT INVENTION

The present invention relates to an olefin based composition suitable for a surface covering comprising: (A) 5 to 45% by weight of an ethylene propylene copolymer; (B) 3 to 30% by weight of a thermoplastic bio-resin derived from starch and/or other sources, such as non-genetically modified thermoplastic starch; (C) 0.1 to 5% by weight of an acid or anhydride functionalized polyolefin as a compatibilizer; (D) 0.5 to 20% by weight of a styrenic thermoplastic elastomer; (E) 50 to 85% by weight of filler; and (F) 0.1 to 5% by weight of one dispersion agent made from isotactic polypropylene homopolymer. Optionally, the blend can also include a hydrocarbon tackifier that can comprise a blend of an aliphatic hydrocarbon resin and an aromatic hydrocarbon polymer functionalized with fatty acid ester. Optionally, the blend can also use an ethylene octene copolymer produced by a single site catalyst; the ethylene octene copolymer can at least partially (or fully) replace component (A) ethylene propylene copolymer. All weight percents are based on the total weight of the composition.

The surface coverings produced by the invention and the composition listed above can be of two general types. One type is a homogeneous construction, which is as defined by ASTM F-1913 or ASTM F 1066 where Through Pattern Tile is defined as the pattern and colors on the surface of the tile extend entirely through the thickness of the tile without significant change, or the colors appearing on the surface shall extend throughout the entire thickness of the material, although the appearance of the pattern created by these colors may change through the thickness. The surface covering or flooring articles made with the olefin based composition optionally may also contain a special top coat(s), such as a urethane coating.

The second type is a heterogeneous construction that is defined as multiple distinctively layered sheets in the thickness dimension of the construction. The surface coloring or decorating elements need not extend through the entire thickness of the floor coverings but may be present on one single layer(s) in the construction. For example, a surface covering can comprise a polyolefin composition substrate with or without the decorative chip elements as applied in either a homogeneous or heterogeneous product. For the heterogeneous product, a printed décor layer is either directly or indirectly applied or laminated on top of the polyolefin composition base, and, optionally, a highly wear and scratch resistance top coating system is optionally applied on the polyolefin composition substrate of a homogeneous product, or alternatively, on the décor layer of a heterogeneous product including the polyolefin composition substrate.

A "bio-resin," as referred to herein, refers to a resin or resin formulation derived from a biological source.

A "starch," as referred to herein and unless defined differently in context, is any starch of natural origin whether processed, chemically modified or treated, including starches such as for example: wheat starch, cornstarch, potato starch, and rice starch. Starch can also be derived from plant sources such as cassaya, tapioca, and pea. Starch can be a polysaccharide that can be a blend of amylose and amylopectin. The starch can be made from any source. The starch can be non-genetically modified starch. Starch can include modified starches, such as chemically treated and cross-linked starches, and starches in which the hydroxyl groups have been substituted with organic acids, to provide esters or organic alcohols to provide ethers, with degrees of substitution in the range 0-3. Starch can include extended starches, such as those extended with proteins; for example with soya protein.

A "tackifier," as referred to herein and unless defined differently in context, is a substance, when added to resins, improves the initial and extended adhesion range of one or more substances. This component can be particularly important for enhancing the processability, such as calendaring.

The olefin based composition of the present invention preferably provides an environmentally friendly and sustainable material, suitable for surface coverings, such as floor coverings. The composition can be free of halogens, toxic compounds, dioxins, and/or plasticizers. The composition can be made in various flex moduli suitable for sheet or tile surface covering applications. In addition, compared to surface coverings made from polyvinyl chloride (PVC) sheet products, surface coverings made from the compositions of the present invention exhibit, better impact resistance, better tear resistance, better resistance to indentation, better heat and light resistance, and lower smoke and carbon mono-oxide gas generation when burned.

According to this invention, the role of the an olefin copolymer (A) is to impart elasticity, impact resistance, and ease of process of the composition used in making the surface covering, although not limited thereto. The component (A) of this invention can include, but is not limited to, an ethylene propylene copolymer produced by Ziegler Natta catalyst. More preferably, the ethylene propylene copolymer is a heterophasic polymer produced from a Ziegler Natta sequential polymerization as described in U.S. Pat. Nos. 5,302,454; 5,286,564; and 5,212,246, which are incorporated herein by reference. The preferred ethylene propylene copolymer has a melt flow rate of from about 0.5 to about 15 g/10 min. at 230° C. and 2.16 Kg according to ASTM D1238. The melting point of the ethylene propylene copolymer generally should be less than 170° C., and preferably is in the range from 140° C. to 160° C., as measured by Differential Scanning calorimetry (DSC). It also has an ethylene content of 20 to 60 weight % and a total rubber content of 30 to 70 weight %. This ethylene propylene copolymer has a flex modulus of less than 600 Mpa as measured by ASTM D790, particularly from 20 Mpa to 500 Mpa, and a density of about 0.870 to about 0.900 g/cm$^3$.

Examples of preferred heterophasic ethylene propylene copolymers used in this invention are commercially available from LyondellBasell under the trade name SOFTELL™ and ADFLEX™.

The ethylene propylene copolymer, component (A) of this invention is preferably present in an amount of from about 10 wt % to about 90 wt %, based on the weight of the composition. More preferably, the ethylene propylene copolymer is present in an amount of from about 5 wt % to about 45 wt %, based on the total weight of the composition. Other amounts below and above these ranges can be used.

The blending of bio-resin, component (B) according to this invention, with an olefin polymer, e.g. ethylene propylene copolymer, component (A) also according to this invention is to enhance environmental and sustainable characteristics including: 1) to reduce the consumption of petroleum based thermoplastic polymers thus reducing the use of natural gas resources by replacing them with a rapid renewable material, and/or 2) to impart the low smoke and low carbon mono-oxide gas generation when burned. The bio-resin can be a thermoplastic and biodegradable resin. The bio-resin can be a starch based polymer derived from agricultural products, such as corn, wheat, potatoes, soy, soy bean, or non-agricultural products, such as, grass and switch grass. The bio-resin can be derived from, for example, natural or modified cornstarch. Cornstarch, or cornflour, is the starch of the maize grain, commonly known as corn, which is a renewable resource. It can also be grown from the endosperm, or white heart, of the corn kernel. The composition of cornstarch can be approximately 25 wt % amylose and 75 wt % amylopectin. The cornstarch can be prepared by steeping the corn for 30 to 48 hours. The germ can be separated from the endosperm and those two components can be ground separately (still soaked). The starch can then be removed from each by washing. The starch can be separated from the gluten and other substances, mostly in hydrocyclones and centrifuges, and dried. Finally, the starch can be modified by, for example, treatment at elevated temperature and pressure with addition of defined amounts of water to form a melt. Such a melt is referred to as modified, gelatinized or destructurized starch. The modified starch can be mixed with additives such as plasticizers and/or other biodegradable materials to obtain a thermoplastic starch or TPS. The starch can be modified as described in WO 03/051981 A1, incorporated by reference herein in its entirety. Another example of a bio-resin is one derived from soy flour and/or soy meal and/or other sources.

A preferred bio-resin, component (B), as disclosed in this invention is derived from non-genetically modified starch and available from PSM (HK) Company Limited under the tradename PLASTARCH MATERIAL or PSM by proprietary processes developed by Wuhan Huali Environmental Protection Science & Technology Co., Ltd, Wuhan Optic Valley of China. The PSM starch-based biodegradable material properties, composition and processing are described in International Published Patent Application Number WO 03/051981 A1, and China National Patent Numbers 01138290.2 and 02115416.3, incorporated herein by reference. PSM is a non-genetically modified thermoplastic starch. In other words, the genetic structure of the cornstarch has not been modified by the transfer of a gene or genes from other related or non-related life forms. The cornstarch can be modified in order to obtain heat-resistant properties, making PSM one of the few bioplastics capable of withstanding high temperatures. PSM is stable in the atmosphere, but biodegradable in compost, wet soil, fresh water, seawater, and/or activated sludge where microorganisms exist. The bio-degradability of the PSM bio-resin conforms to ASTM D6400. The PSM thermoplastic starch can comprise 65-95 wt % plant starch, and 1-15 wt % reactive plasticizer; it has a softening temperature of 257° F. (125° C.) and a melting temperature of 313° F. (156° C.), a density of 1.12 to 1.3 g/cm$^3$, and a melt flow rate of 0.5 to 2.0 g/10 min. The thermoplastic starch can be made by the process referenced in WO 03/051981 A1.

Examples of PSM commercially available products used in this invention are HL-101, HL-102, HL-103 and HL-104. The bio-resin can be present in the composition in an amount of from about 3 wt % to about 50 wt %, based on the weight of the composition. More preferably, the bio-resin is present in an amount of from about 5 wt % to about 30 wt %, based on the total weight of the composition. Other amounts below and above these ranges can be used.

The compatibilizer component (C) of this invention can be at least one polyolefin modified and/or functionalized with a polar group. The term "compatibilizer" is referred to herein as a polymer that, when added to a blend of immiscible or incompatible polymers, modifies the interfaces and/or stabilizes the phase morphology and/or improves physical appearance and/or improves one or more properties. The compatibilizer, therefore, can improve the adhesion between dissimilar compositions and/or layers of materials. According to this invention, preferably, the compatibilizer component (C) is a polymer that acts as a compatibilizer for the polyolefin and the thermoplastic starch as well as a coupling agent and interfacial bonding agent for a polyolefin matrix, a thermoplastic bio-resin and filler such that it can provide ease to process and good mechanical properties The term "functionalized" is referred to herein as having at least one functional group. For example, "functionalized polymer" is meant to include a polymer that is reacted with a functional group, and optionally, a catalyst, heat, initiator, or free radical source, to cause all or part of the functional group to incorporate, graft, bond to, physically attach to, and/or chemically attach to the polymer or other polymers. In addition, if a polymer, such as a polyolefin, is "modified or functionalized," it can either have at least one functional group attached by any method as described above, and/or it is a polymer that is directly polymerized from monomers (or produced by using an initiator and/or radical having a functional group) where the polymer has a functional group at a chain end. Therefore, the polyolefin that has a polar group modified and/or functionalized according to the present invention, is a polyolefin that can be produced, for example, by radical induced and reactive extrusion.

According to this invention, the backbone of the compatibilizer or the modified and/or functionalized polyolefin component (C) can be a polypropylene homopolymer, a polypropylene random copolymer, or a polypropylene ethylene copolymer, or an elastomeric copolymer, or an copolymer of ethylene and an alpha-olefin having C4-C10. The polar group can be any polar group that can be used to functionalize the polyolefins. The polar group may be obtained, e.g., from unsaturated organic acid anhydrides and/or unsaturated carboxylic acids. The polar group can comprise, but is not limited to, a carboxylic acid group, cyclic acid anhydride such as succinic anhydride, maleic anhydride, acrylic acid, acrylate, methacrylate, ethylene methacrylic acid, or any combination thereof.

The functionalized polyolefin may be produced, for example, using a radical initiator, and the source of the radical initiator can be peroxides, other chemicals, or high energy radiation. Processes for making the polar group-functionalized polyolefin are described, e.g., in U.S. Pat. Nos. 4,548,993; 5,955,547; and 6,046,279 describing maleation of polypropylene by a peroxide initiator, and U.S. Pat. No. 5,411,994 describing a graft polyolefin obtained by radiation, which are incorporated herein by reference.

A preferred compatibilizer component (C) is a polypropylene-grafted maleic anhydride where the polypropylene backbones has an isotactic index of at least 80% (e.g., 80% to 100% or 80% to 99%), more preferably from 85 to 95% or more, as measured by the classic hexane index or any modern NMR method, having the maleic anhydride group present in an amount from 0.1 to 2 wt %. The melt flow rate of the maleic anhydride functionalized polypropylene can range from 20 to 500 g/10 min and more preferably is from 100 to 450 g/10 min at 230° C. and 2.16 Kg by ASTM D1238.

A preferred compatiblizer is a maleic anhydride functionalized random copolymer of polypropylene where the amount of grafted maleic anhydride onto the polypropylene backbone may range from 0.5 weight % to 5 weight %, and more preferably from 0.9 weight % to 2.0 weight %. Other amounts below and above these ranges can be used. The melt flow rate of the functionalized polyolefin can range from 20 to 500 g/10 min., and more preferably is from 100 to 450 g/10 min. at 190° C. and 2.16 Kg by ASTM D1238.

Examples of a suitable commercially available functionalized polyolefin can include POLYBOND® from Chemtura Corp., or EPOLENE® from Eastman Corp., EXXELOR® from ExxonMobil Corp., and FUSABOND® from E.I. DuPont de Nemours.

The compatibilizer component (C) can be present in an amount of from about 0.1 wt % to about 5 wt %, based on the total weight of the composition. More preferably, the compatibilizer can be present in an amount of from about 0.5 wt % to about 2 wt %, based on the total weight of the composition. Other amounts below and above these ranges can be used.

The compatibilizer can serve as a coupling agent and/or compatibilizer for the polyolefin and filler, as well as for the polyolefin and the bio-resin. Good compatibility can provide good mechanical properties, such as impact and crack resistance, and/or tear and indentation resistance.

The olefin component provides recyclability, good mechanical properties, such as impact resistance and/or indentation resistance, and/or better heat and light resistance than PVC. For a surface covering with flexibility, such as a soft sheet, a blend composition can be used with a good balance of lower stiffness and thus is more flexible, and still maintains good resistance to indentation and tear resistance. This is why a PVC composition used for surface covering applications always contains a liquid plasticizer which is not necessarily environmentally preferred but is very effective in a softening sheet in order to make it more flexible and easy to handle. In this invention, the addition of a thermoplastic elastomer, component (D), is to purposely impart a good balance of properties, e.g. flexible sheet with good indentation and tear resistance properties. Unlike PVC, the composition shown in this invention contains no liquid plasticizer, and the flexibilizer used in this invention is a non-migrating material. Although any material considered a rubber, thermoset elastomer, or thermoplastic elastomer can be used as a flexibilizer for the olefin/thermoplastic starch blend, the thermoplastic elastomer is most preferred for reasons of recyclability.

According to this invention, the preferred thermoplastic elastomer is a styrenic thermoplastic elastomer. Examples of styrenic thermoplastic elastomers include, but are not limited to, hydrogenated and/or non-hydrogenated, linear, or branch or block styrenic thermoplastic elastomers, and/or styrenic thermoplastic elastomers functionalized with a cyclic acid anhydride side chain. Examples of hydrogenated styrene thermoplastic block elastomers are SBS: Styrene-Butylene-Styrene, SIS: Styrene Isoprene Styrene, and SEBS: Styrene-Ethylene-Butylene-Styrene, SEPS: Styrene-Ethylene-Propylene-Styrene. An example of a non-hydrogenated polystyrene elastomer is styrene butadiene block copolymer. A more preferred styrenic thermoplastic elastomer is a hydrogenated styrenic thermoplastic block copolymer with ethylene/butylene (SEBS) or ethylene/propylene (SEPS) due to the compatibility of these block copolymers with the olefin component (A) of this invention. The styrenic thermoplastic block copolymer provides desirable balance; the rigidity, e.g. good indentation resistance, comes from the styrenic resin portion while the flexibility comes from the non-styrenic resin portion, e.g. ethylene/butylene, or ethylene/propylene elastomer of the block copolymer. Examples of a commercially available styrene thermoplastic elastomer are Kraton® G and Kraton® D from Kraton Polymer™.

The preferred styrenic thermoplastic block copolymers used in this invention are the styrene/ethylene/butylene and styrene/ethylene/propylene block copolymers where the polystyrene content in the block copolymer is from is 5 to 40 wt %, such as from 7 to 30%, and/or the block copolymer having a melt flow rate of from 2.5 to 25 g/10 min. measured at 230° C. and 2.16 Kg by ASTM D1238.

The styrenic thermoplastic elastomer can be present in an amount of from about 0.5 wt % to about 20 wt %, based on the total weight of the composition. More preferably, the styrenic thermoplastic elastomer is present in an amount of from about 0.5 wt % to about 15 wt %, based on the total weight of the composition. Other amounts below and above these ranges can be used.

The composition in this invention also comprises filler, component (E). The filler can be any conventional filler, especially those types traditionally used in surface coverings. The filler can be organic, inorganic, or a combination of both, such as with different morphologies. Inorganic filler can provide dimensional stability, for instance, to a resilient compositional tile, and, in general, can provide fire resistance to the composition. Examples include, but are not limited to, coal fly ash, calcium carbonate, barium sulfate, carbon black, metal oxides, inorganic material, natural material, alumina trihydrate, magnesium hydroxide, bauxite, talc, mica, barite, kaolin, silica, post consumer glass, or post industrial glass, synthetic and natural fiber, or any combination thereof. Preferably, the filler comprises talc, mica, calcium carbonate, barite, kaolin, silica, glass, or any combination thereof. More preferably, the filler comprises calcium carbonate from limestone and, for instance, can have a particle size from about a 40 mesh (420 microns) to 325 meshes (44 microns), although smaller particle size fillers can also be used, and coated or non-coated limestone can also be used.

As a non-limiting example, limestone (calcium carbonate optionally with magnesium carbonate) can be used as the filler. A specific non-limiting example is untreated dolomitic limestone (which can be screened), having an upper mesh size of about 50 mesh (297 microns). Dolomitic limestone is commercially available from Specialty Minerals, Inc. under the product code DF-5025, or fine particle lime stone with average particle size about 3-5 micron under product code Vicron® 15-15.

As a non-limiting example, the preferred filler is a recycled filler. A specific non-limiting example is recycled glass or sodium lime plate glass having particle sizes from 200 (74 microns) to 350 meshes (40 microns) which are commercially available from Dlubak. As a non-limiting example, a combination of recycled glass and calcium carbonate can also be used to reduce the cost and to include recycled content in the surface covering composition of this invention.

The filler can be in any physical form that allows it to be mixed or blended with the other components to form the olefin based composition that, for instance, can be processed into an olefin based composition tile. Typically, the filler is in the form of particles.

The filler or fillers may be present in the composition in an amount of at least 30 wt %, preferably from about 50 wt % to about 85 wt %, based on the weight of the composition. Other amounts below and above these ranges can be used. For example, the amount of filler or fillers can be varied in order to obtain the desired flexural modulus and/or indentation or impact balance for a base in a laminated structure or sheet structure.

When a high level of filler is used, e.g. >30 wt % or to about 50 wt % or more in the total composition, the compositions according to the present invention can contain at least one dispersion agent (F). Any dispersion agent that functions as a dispersant aid for various components of the composition, such as, for filler or a pigment, can be used. Preferably, the dispersion agent comprises at least one ultra high melt flow rate polypropylene homopolymer (UHMFR PP). It is considered a non-migrating, non-wax dispersion aide, unlike other low molecular weight dispersion aids, which on occasion may migrate to the surface, interfere with adhesion of the olefin substrate with the other surface, such as print, underlayment or adhesive, etc. Some low molecular weight dispersion aids also typically have a negative impact on stiffness, and thus indentation resistance. By comparison, the UHMFR PP dispersion aid not only effectively disperses the pigments and filler, but also helps to improve the stiffness and indentation recovery. For purposes herein, the term "UHMFR" refers to resins with a melt flow rate greater than 100 g/10 min. as measured by ASTM D 1238 at 230° C. and 2.16 Kg. A polyolefin having a melt flow rate (MFR) greater than 100 g/10 min as measured by ASTM D 1238 at 230° C. at 2.16 Kg is generally considered very fluid in this field. The preferred UHMFR polyolefin is an isotactic polypropylene having an isotactic index greater than 80% (e.g., 81% to 99%), preferably greater than 90% (e.g., 91% to 99%). This very fluid and high melt flow rate isotactic polypropylene homopolymer can be produced by either free radical degradation of the polymer in the presence of peroxide which is known in the art or by direct polymerization methods either by Zeigler Natta catalyst or by single site catalyst such as that of metallocene. Preferably, the UHMFR isotactic polypropylene used in this embodiment has a melt flow rate from 1000 to 2,200 g/10 min. at 230° C. and 2.16 Kg as measured by ASTM D1238, and more preferably is a peroxide visbroken isotactic polypropylene having a melt flow rate of 1200 to 2000 g/10 min. Examples of such polymers are VALTEC™ and METOCENE™, which are commercially available from LyondellBasell. The dispersion aid, however, can be used with any amount of filler.

The ultra high melt flow polypropylene may be present in an amount of from about 0.1 wt % to about 5 wt %, preferably from 0.5 to 2 wt %, based on the total weight of the composition. Other amounts below and above these ranges can be used.

In one aspect of this invention, in order to improve processing, for a floor covering or a laminated surface covering, the composition of this invention can also optionally contain a hydrocarbon tackifier. The hydrocarbon tackifier, when added to resins, can improve the initial and extended adhesion range of one or more substances and/or improve the processability, such as calendaring.

The hydrocarbon tackifier can be or comprise at least one hydrocarbon. Any hydrocarbon that is suitable in forming a surface covering can be used. The hydrocarbon can comprise an aliphatic hydrocarbon, a cycloaliphatic hydrocarbon, an aromatic modified aliphatic hydrocarbon, an aromatic and aliphatic hydrocarbon modified with fatty acid ester or any combination thereof. Preferably, the hydrocarbon tackifier comprises a blend of an aliphatic hydrocarbon resin with at least one aromatic hydrocarbon polymer and functionalized with at least one fatty acid ester, which has a softening temperature at 103 to 113° C. Commercially available examples of the hydrocarbon tackifier include, e.g., ESCOREZ™ from ExxonMobil Corp., and STRUKTOL TR016™, STRUKTOL TR044™, or STRUKTOL TR065™ from Struktol of America.

The hydrocarbon tackifier can be present in an amount of from about 0.1 wt % to about 5 wt %, preferably about 0.5 to 2 wt %, based on the total weight of the composition. Other amounts below and above these ranges can be used. This component preferably improves the rheological property of the composition. For instance, this component helps to reduce the flux time and/or mixing torque, as well as helping to impart tacking property.

The compositions according to the present invention can optionally contain one or more additives, such as, antimicrobials, biocides, pigments or colorants, modifying resins, cross-linking agents, antioxidants, foaming agents, other tackifiers, and/or other conventional organic or inorganic additives commonly used in polyolefin or in other surface coverings, such as, but not limited to, UV-stabilizers, antistatic agents, thermal and light stabilizers, flame retardants, or any combination thereof. These additives and how they are incorporated into different compositions or layers of surface coverings are described in U.S. Pat. Nos. 5,112,671; 4,614,680; 4,187,131; 4,172,169; 4,423,178; 4,313,866; and 5,380,794 incorporated by reference in their entireties herein. Preferably, the composition includes at least one pigment, non-halogenated flame retardant, thermal stabilizer, light stabilizer, and/or antistatic agent, or any combination thereof.

For example, the most preferred flame retardant as shown in this invention is the non-halogenated flame retardant, which can include, but is not limited to, any metal hydroxide, organic phosphate ester, phosphate, inorganic phosphorous salt, boron-containing compound, melamine, and/or ammonium sulfamate. Most preferred are the metal hydroxides, such as aluminum trihydrate or magnesium hydroxide, either with or without surface treatment. Most preferred is magnesium hydroxide surface treated with a fatty acid, such as for compatibility and/or better wet out of the olefin matrix, especially when the composition as shown in this invention also contains a functionalized polyolefin as a compatiblizer (C).

For example, a stabilizer can be added to the composition according to the present invention, to provide heat stability and/or UV light stability to the composition. The stabilizer can be used to minimize degradation and/or discoloration caused by exposure to heat and light, including conditions encountered in the manufacture of a product containing the composition of the present invention. The stabilizer, according to the present invention, is preferably selected for its effectiveness with the particular homopolymer-copolymer blend of the present invention. The stabilizer can be an antioxidant, other stabilizers, or combinations thereof. Any antioxidant commercially available or known can be used. An exemplary antioxidant/heat stabilizer is a phenolic compound (e.g. Phenol, 2,4-Bis(1,1-dimethyl)-phosphate), commercially known as Irgafox 168. Another antioxidant/heat stabilizer is Benzenepropanoic acid, 3,5-bis(1,1-dimethyl)-4-hydroxy-,2,3-bis[[(3-[3,5-bis(1,1-dimethylethyl)-4)-hydroxyphenyl]-1-oxopropoxy]methyl]-1,3-propanediyl ester which is commercially known as Irganox 1010. Both are available from Ciba. Specific non-limiting examples include blends of the above antioxidants/heat stabilizers, which are also supplied by Ciba, under the product code B225. The typical amount of the antioxidant/heat stabilizer used for the olefin blends in this invention is 0.10 to <0.50 phr. Other amounts below and above these ranges can be used.

The additives can be used and varied in amounts as needed and known to those skilled in the art.

Optionally, at least one component of the composition can be a recycled material, such as a material obtained from post consumer or post industrial waste. For example, the recycled material can comprise a polyolefin, such as polyethylene, polypropylene, ethylene propylene, or olefin copolymers, carpets having an olefin backing with nylon faced yarn, carpets having an olefin backing with olefin faced yarn, glass beads, coal fly ash, gypsum or any combination thereof. The recycled materials may be obtained as post consumer or post industrial polyolefin recycled material or other reusable waste, such as that obtained from polyethylene, polypropylene, or copolymers thereof, such as from film, bottle, or other post consumer or post industrial waste. The composition of the present invention can be at least partially biodegradable.

In another aspect, the present invention relates to surface or floor coverings comprising the olefin based composition of the present invention. The surface or floor covering can be in the form of a sheet, a tile, or a plank. The sheet, tile, or plank can have any shape or size. The surface or floor covering can comprise substantially the composition, or can comprise one or more additional layers of material.

The compositions of the present invention can be used as a stand alone product, such as an olefin composition tile or sheet product. The surface or floor covering optionally does not contain layers of different material as those of laminated floor coverings. The stand alone product can have one or more additional layers, such as a protective coating (wear resistant and/or top coat layer), or no protective coating at all. Any additives, such as those mentioned herein, including pigments, can be added to form the stand alone product.

Alternatively, the compositions can be combined with other materials or layers to form the surface covering, such as a laminated surface or other structured floor covering as further described.

For example, a laminated surface or other structured floor covering can comprise a backing layer comprising the composition of the present invention, wherein the backing layer has a top surface and a bottom surface; a décor layer (or print layer) having a top surface and a bottom surface, wherein the bottom surface of the décor layer can be affixed to the top surface of the backing layer; and at least one wear layer having a top surface and a bottom surface, wherein the bottom surface of the wear layer can be affixed to the top surface of the décor layer.

In one aspect, the surface coverings, for example, may include: (i) an olefin based composition backing substrate comprising the olefin based composition; (ii) a printed décor layer laminated on top of the polyolefin composition base; and (iii) a radiation cured coating surface including a wear layer. The surface coverings also optionally may include an additional layer(s), such as a glass mat and/or synthetic film. The glass mat and/or synthetic film layers can be in any order, thickness, and/or composition suitable for balancing the structure and performance of the surface covering. The olefin based composition used for the backing substrate may be varied within the scope of the invention to obtain various stiffness or flexibility and impact balances to provide a base that then can be directly printed on or laminated upon with a printed visual, and a special radiation curing coating for excellent performance and low maintenance specially designed for surface covering applications.

The décor layer, also called a printed visual, can comprise a gravure print, a digital print, a flexo print, a transfer print, a pad print, a stamping print, a decorative painting, or any combination thereof. Any conventional printing means can be used to produce the décor layer. The printed visual on the décor layer can have any pattern, such as, but not limited to, simulated natural surfaces, such as natural wood, stone, tile, marble, granite, brick appearance, or the like. As a non-limiting example, a décor layer comprises a design layer that has chemically or mechanically embossed textures in register so as to simulate such features found in natural surfaces (e.g., grout lines, wood grain, wood knots, ceramic surface textures, and the like). Any ink composition can be used, such as those that contain an acrylic resin, water, alcohol, and one or more pigments. A design can be done in register using multiple station rotogravure printing.

The décor layer can include a substrate, wherein the substrate can comprise one or more polymer (e.g., plastic) films and/or papers (e.g., cellulose). Preferably, the plastic film does not contain halogenated materials. The film provides excellent dimensional stability against product growth or shrinkage which can exist due to moisture or humidity from the environment. These films may be selected from thermoplastic films, such as acrylic, polyolefin, ionomer, and polyester. Alternatively, a cellulose base paper can be used as the substrate for the décor layer. If cellulose base paper is used, the moisture content of the paper should be controlled or limited to a very low level prior to sealing the paper with coatings. This would prevent any dimensional change of the paper due to absorbing moisture from or releasing moisture to the environment. Thus, dimensional changes to a laminated structure, such as, bowing, doming, curling or warping, can be prevented. Examples of cellulose base layers and methods of incorporating them into laminated or surface coverings are described in U.S. Pat. No. 6,986,934, which is incorporated by reference in its entirety herein. Other types of film or materials for the décor layer are possible.

A method of making a laminate surface covering can be for an olefin based composition described herein as a substrate backing for one or multiple coating layers of high scratch and high wear resistance, such as unsaturated functional acrylate coatings that have aluminum oxide particles embedded inside the coating layers. For the heterogeneous product, the coating layers can be applied directly on the décor surface of a heterogeneous product structure and cured by radiation energy with a sufficient dosage of electron beam or UV light. The décor layer can be created by any conventional means of applying decoration, such as printing, painting, and the like. In printing technology, gravure printing, digital printing or flexo printing can be the choice. The preferred printing substrates are a plastic film or paper. More preferably, the printed visual in the surface covering does not contain any halogenated compound (thermoplastic or thermoset). The printing substrate can be selected from the following polymer groups: acrylic, cellulosic, polyester, polyurethane, polyolefin, ionomer, and the like, or any blends of the above materials. The high scratch and high wear resistance coating(s) and décor layer(s) preferably are laminated by hot melt glue and/or heat bonded on a surface of the olefin based substrate composition. Other attachment techniques known to those in the art can be used.

Optionally, the décor layer can comprise a printed design on an aminoplast resin impregnated printed design, as described in U.S. Pat. No. 6,986,934, which is incorporated by reference in its entirety herein. The aminoplast resin is a blend of urea formaldehyde and a melamine formaldehyde. The printed or décor layer can be located on top of an underlay which comprises a Kraft paper impregnated with aminoplast resins or phenols.

Embossing in the décor layer can be provided mechanically as well. For purposes of mechanical embossing, generally, the pressure applied to the layer is sufficient to create an embossing of, for example, from about 1 mil to about 12 mils, more preferably from about 3 mils to about 8 mils. It is certainly within the bounds of the present invention to use several devices to mechanically emboss different textures onto the layer.

A wear layer forming at least a portion of a surface covering according to this invention can be provided as a single layer, or, alternatively, may comprise a multiple layer construction for a variety of purposes, such as providing strength, providing wear resistance, providing mar or stain resistance, and the like. A wear layer can comprise unsaturated functional acrylates, with or without aluminum oxide and/or other wear resistant particles. Preferably, the unsaturated functional acrylates comprise epoxy oligomers, urethane oligomers, polyester oligomers, or any combination thereof. Alternatively, the wear layer can comprise reactive monomers, wherein the reactive monomers can include a mono-functional diluent, a di-functional diluent, a multi-functional diluent, or any combination thereof. Other components can be present in one or more resistant layers, such as, but not limited to, at least one surfactant, at least one defoaming agent, at least one abrasive resistant particle, or any combination thereof, and optionally, at least one photoinitiator. If a photoinitiator is used, the wear layer can be cured by electron beam or radiation, such as ultraviolet Aluminum oxide (or other metal oxide or ceramic or oxide thereof) can be used as an abrasive (or wear resistant particle) in a wear layer included in a surface covering according to the present invention. It is also known as alumina or $Al_2O_3$. Preferably, the wear resistant particles are fused or calcined. The refractive index can be from about 1.4 to 1.7. Other wear-resistant particles can be used and can include, but not limited to, carborundum, quartz, silica (sand), glass particles, glass beads, glass spheres (hollow and/or filled), plastic grits, silicon carbide, diamond dust (glass), hard plastics, reinforced polymers, organics, and the like, and may be substituted for all or part of the alumina.

Also, while any source of aluminum oxide can be used, it is preferred that the aluminum oxide have the following characteristics: fused or calcined and having a hardness of from about 6 to 9 on a Moh's scale, and most preferably about 9 on a Moh's scale. Preferably, the particle size of the wear-resistant particles is from about 10 microns to about 350 microns, and more preferably from about 20 microns to about 250 microns, and most preferably from about 10 microns to 70 microns. Sources for preferred aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc. Birmingham, Ala.

As a non-limiting example, the wear layer can comprise two layers as described herein. More than two coating layers, such as three, or four or more (and with the same or different compositions) can be used. A first coating layer can include a semi-cured B-stage cure that is used to receive a second coating layer for good adhesion. A second coating layer can include a cure that is similar to the formulation of the first coating layer, but without any abrasive particles. The second coating layer can be applied on the surface of the first coating layer, or directly on an embossed texture surface of a release film. In this later option, the release film with the second coating layer can then be applied on the surface of the first coating layer. Both layers can be wet at first and then cured. The release film can provide a gloss control of the finished product. If the release film is used, an electron beam can be used to penetrate the film and cure the coating layer(s) by achieving cross-linking of oligomers and monomers of the coating layers. Various commercial grades of high abrasive decorated and coated layers comprising one or more wear layers are available, such as a product available under the trade name ELESGO™ from DTS-Systemoberflachen (Germany), or those supplied by W.K.P. (Germany).

The preferred polymerizable cross-linking monomers in a strengthening or wear layer are the mono-, di-, tri- and tetrafunctional acrylates and methacrylates and blends thereof prepared by the esterification of the appropriate alcohols with acrylic or methacrylic acid. The most preferred polymerizable cross-linking monomer is trimethyloipropane trimethacrylate. Other preferred monomers are trimethyloipropane triacrylate, pentaerythritol tetraacrylate, and/or pentaerythritol tetramethacrylate. Monofunctional and/or difunctional acrylates and methacrylates, such as 2-ethylhexyl acrylate, lauryl methacrylate, hexanediol diacrylate and diethylene glycol dimethacrylate, may be blended with the tri- and/or tetra-functional cross-linking monomer to reduce cross-link density. Other monomers can be used.

The preferred free radical polymerization for purposes of the strengthening layer or wear layer is by radiation curing. A radiation curing process can be used to initiate cross-linking reactions among all reactive materials in the system by means of high energy electron beam or ultraviolet radiation. Creating free radicals for UV curing requires the use of photo-initiators as well as reactive monomers and pre-polymers. Photo-initiators decompose on exposure to UV light to produce initiating free radicals, which start the chain reaction until reactive ingredients become polymerized, solid and dry. A three dimensional network of hard solid dry coating is then formed. Photo-initiators can be grouped into 4 classes based on their chemical behavior on photolysis. Class 1: Aromatic ketone initiator functions via a H-atom abstraction process. Initiators commonly used in this class are Benzophenone; 4-phenyl Benzophenone and the like. Class 2: initiators undergo a fragmentation on exposure to UV. The more widely used photo-initiators in this class are Benzoin, Benzoin ethers. Class 3: Tertiary amines/H-atoms Abstraction photoinitiators such as triethanolamine/benzophenone; methyl diethanolamine/benzophenone. Class 4: photo-initiators derived from acetophenone, which functions by either H-atom abstraction process or fragmentation. The broadly used photo-initiators in this class are 2,2 diethoxyacetophenone; αα dichloroaceto, ρ-phenoxyphenone. Radiation pre-polymers can generally be categorized as Epoxy Acrylates; Urethane Acrylates; Unsaturated Acrylates; Polyester Acrylates; Polyether Acrylates and Vinyl/Acrylic system. The selection of the reactive monomers, pre-polymers as well as photo-initiators will dictate the amount of cross-linking density of the strengthening or wear layer. Other additives can also be used.

A wear layer can be provided as a top coat layer of a surface covering according to this invention. As a non-limiting example, a wear layer top coat can comprise a hard, thermoset, UV-curable blend of acrylic or acrylate monomers having a glass transition temperature (Tg) of greater than 30° C. The thickness of a wear layer top coat, once cured, can be from 0.3 mil to 1.5 mils, more preferably from 0.5 mil to 1.0 mil.

The bottom surface of the décor layer can be affixed to the top surface of the olefin based backing layer comprising the olefin based composition or other substrate by materials such as a primer/adhesive, such as a hot melt, moisture cure polyurethane glue. Examples of such adhesives and their applications are described in U.S. Pat. No. 6,986,934, which is incorporated by reference herein in its entirety. A preferred hot melt adhesive is Ever-Lock® 2U145/2U230 modified polyurethane adhesive reactive hot melt from Forbo Adhesives, L.L.C.

In one particular aspect, the surface covering can comprise a backing substrate comprising an olefin based composition, a décor layer, and a radiation cured top coating system including at least one wear layer, wherein the décor layer comprises a multilayered laminate based on a non-PVC film decorated with pattern and color by any printing means. Various commercial grades of highly abrasive decorated and coated layers that can be used in the décor layer structure are available in the marketplace, such as the above-referenced ELESGO™ product supplied by DTS-Systemoberflachen in Germany, or those available from W.K.P. in Germany. The printed décor preferably is initially coated with a primer on the back of the film to enhance adhesion of the printed film to the top surface of the olefin based composition backing substrate.

In this particular aspect, the opposite top surface of the printed décor preferably is coated with a radiation cured top coating system comprising (i) unsaturated functional acrylates including epoxy, urethane, and/or polyester type oligomers, (ii) reactive monomers including mono-functional, di-functional and/or multi-functional diluents, (iii) optionally, other ingredients, such as surfactants, defoaming agent and/or abrasive resistance particles such as aluminum oxides, etc., and optionally, (iv) a photoinitiator, depending upon the means of radiation cure. When choosing ultraviolet light as the means to cure the radiation curable coating system, the photoinitiator generally is present for the coating. However, the photoinitiator can be omitted if this coating is cured by an electron beam system. The first radiation curable coating layer of the radiation curable coating system generally must be semi-cured, i.e., B-stage cure, before receiving a second coating layer for good adhesion. It also may include abrasive particles, such as with particles sizes ranging from 20 to 200 microns or particle sizes less than 100 nano-meters (e.g., 10 to 99 nm). Preferably the formulation of the second radiation curable coating layer is very similar to the first coating layer except for removal of abrasive particles. The second radiation curable coating can be directly applied on the embossed texture surface of the release film or applied on the surface of the first B-stage cured coating. A release film with surface texture can then be laid on the surface of the wet second coat prior to curing the coating. Alternatively, the release film with the second wet coating can lay on the surface of the first B-stage coating. The release film with the surface texture provides the embossed texture and also the gloss control of the finished product. The electron beam process is a suitable way to cure the product in this process because the electrons can penetrate the thick release film in order to reach the active ingredients in the coating being irradiated. This electron beam curing process can be used to achieve crosslinking of oligomers and monomers to form a hard film. The cured multiple top coated and decorated layers can be affixed to the top surface of the olefin based substrate by any means, such as with an adhesive. Preferably the adhesive is a hot melt, moisture cured polyurethane glue, such as described in the above-referenced U.S. Pat. No. 6,986,934.

Additional layers can be present in the laminate surface covering according to the present invention. The additional layers can be used for a variety of purposes, such as for reinforcement. For example, the additional layer can comprise an olefin blend, a glass mat, or a thermoplastic film, or any combination thereof.

Any of the polymers, additives or fillers mentioned previously for the composition according to the present invention, can be used in the additional layers for the laminated structure. The types of polymers, additives, fillers and their amount (including the thickness and order of the layers) can be chosen and varied for the additional layers, for purposes of balancing the structure and performance of the laminated structure.

The components of the olefin based composition or the composition itself can be in any physical form suitable for storage and/or for use to form the composition or the surface covering. For example, many of the components are typically solid ingredients and are typically in particulate or pellet form. Accordingly, these components can be mixed in any order and by any method known in the art for combining particulate solids. The composition can be premixed and stored for a period of time prior to use, or can be mixed just before, or even during, a process for manufacturing a surface covering.

The olefin based composition can be made by any conventional method. The olefin based composition can be processed by numerous methods known in the art including, for example, sheet extrusion, thermoforming, injection molding, calendaring, profile extrusion, blow molding, and/or casting. The dry blends of all the components, including the olefin, fillers, additives, compatibilizer, and the bio-resin, can be compounded in a suitable heated mixer. For example, the olefin based composition can be made by mixing or extruding the components of the composition in a twin screw, a single screw, a mixing bowl with heated jacket, a Banbury mixer, continuous mixer, a ribbon mixer, an extruder with a slot die, by calendaring, extruding, consolidating and laminating, or any combination thereof to form a blend. Preferably, the composition can be processed by processing the polyolefin, bio-resin, the compatibilizer, the thermoplastic elastomer, hydrocarbon, dispersion agent, or any combination thereof, at a temperature close to or above the melting point of the polyolefin, the bio-resin, hydrocarbon, or dispersion agent. Therefore, a blend of the composition can be added to compounding equipment to mix and heat the blend into a uniform hot mass. The polyolefin, the bio-resin and the compatibilizer are preferably melted and blended together to form a compatible blend. The uniform hot mass can then be discharged onto one or more processing machines, such as a 2-roll mill or a calendar roll. A series of calendar rolls can be used to control the thickness and finish of a resulting sheet of the composition. Therefore, the composition can be made in a continuous process or a batch process. This basic composition can be immediately used or stored and later used for any purpose.

If the composition is formulated to be a stand alone product such as multiple-colored and/or variable sized chips (although the chips can be a single color or a single size), one or more color additives can be added to the composition. Once the sheet of composition as described above, is hardened, it can then be chipped or size reduced. The compositions or chips can be stored for future use or they can be immediately and additionally processed to a surface or floor covering, such as a sheet, a compositional tile, or a plank. For example, the multiple-colored or variable sized chips can be consolidated on a belt with an infrared heater or oven and then produced into rolled form. Therefore, in this embodiment, a stand alone or homogenous product can be made from the composition according to the present invention, which does not include a laminated décor layer and protective top coat layers. That is, the olefin based composition can be made into a homogeneous compositional tile or sheet with multiple color chips and variable chip sizes as a decorative visual for a stand alone product without a laminated décor layer. The visual of this product is known in the art as chip visual, and is characterized by its different performance, surface patterns, solid or multiple colors, or through pattern effect as compared to an olefin based laminate structure.

A compositional tile or sheet with the chip visual and composition according to the present invention can be made by using any vinyl composition tile or sheet process capable of handling materials in a chipped and fluxed state. Optionally, the resulting chips from this process can be added on top of a sheet of an olefin based composition as described above that is being processed, in order to yield different product visuals and/or performance characteristics. These chips or sheets can be immediately used or stored and used at a later time for any purpose. The flooring article made with or from the olefin based composition can optionally contain a coating (s) that provides good scratch and stain resistance, such as a urethane containing or urethane top coat.

The present invention also relates to a method for making a surface covering with variegated chips. Thus, the term "variegated chip" refers to a chip containing multiple colors of accent chips that has been intermixed with a major background color within individual chip. Generally, the accent colors are random oriented. Previously, chip visuals, especially for commercial products, have been limited to solid colors or a blend of individual color chips. The ability to blend or inter-mix colors to create variegated color chips provides an added level of depth and richness to the visual.

There have been limited attempts to achieve this through different techniques, with varying degrees of success. One method referenced in U.S. Pat. No. 5,244,942 uses an inter-mixing of mutually different color granules or chips processed by an extruder so that the chips are plasticized and mixed incompletely. Another procedure was to simply co-extrude together two different colors into a single mixing head that incompletely mixes the colors together. Another way is to utilize different melting temperature resins in different colors being processed to obtain intermixing without complete mixing and melting as referenced in U.S. Pat. No. 6,046,265. This method would allow only the different colors to intermix to a various extent because of the differences in the melting points of individual color component and the limited of number of color components.

One primary difference of the process described in this invention is that it does not require differences in melt temperature for each individual accent color chip and more multicolor chips at various ratios can be used depending on the desirable visual. The present method offers a wider process latitude for achieving desirable inter-mixing effects with unlimited numbers of individual color chips. For instance, from 3 to 6 or more individual colors and/or at various blending ratios of each individual color chips can be used.

The production of floor covering having a multicolor blended or variegated visual is primarily explained utilizing the process steps to produce a homogeneous composition and construction. Other product structures besides a homogenous product can be produced utilizing this process as well. The material can be produced into a sheet formed with the described process resulting in a marbleized visual that can be utilized as a flooring product as is or the material can be size reduced into chip or granule form and then followed by a sintering process of making inlaid sheet to produce a flooring product having a random, generally non-directional multi-color variegated visual. The sintering process involves heating the material to the melting point where the particles adhere to each other and then further consolidated with the embossed roll to form a sheet.

The process of making variegated chips includes mixing a "base color" in combination with a mixture of "accent colors" to create a "variegated" patterned or visual effect. The term "base color" hereto is defined as the major background color composition for creating "variegated chips". The variegated chip can contain a base color, for instance, that ranges from 50 wt % to up to 90 wt % in total weight of the variegated chips. The remaining wt % can be accent color pellets. The term "accent color pellets" hereto is or includes a mixture of multiple color individual pellets with a pre-determined ratio amongst them. They are intermixed insufficiently and incompletely with the base color to result in variegated chips. As mentioned earlier, the variegated chips can contain from about 10 wt % to 50 wt % of the "accent color pellets," although other wt % of accent color pellets can be used. One blending ratio that can be used is from 10-30 wt %. Thus, the wt % of the base color plus the wt % of the accent colors equals 100 wt % of the variegated chip.

The "base" composition is defined by the olefin composition of this invention. The "accent" composition can be the same as the "base" composition or distinctively different than the base formulation; so long as the "accent color pellet" is compatible with the base composition so that it does not negatively affect the performance properties. Also, the accent and the base compositions can be different in melting point or melting flow rate in order to provide various flow characteristics for achieving color intermixing. The softening and melting temperature of the accent should not be higher than the base composition by more than about 30° F.

One example of the melting temperature range for the base and the accent is from 280° F. to 340° F. The composition for the accent color can be the same as that of the base.

The process for making accent color pellets can be as follows. In the first step, all of the components of the composition/formulation are charged into heated compounding equipment and brought to a flux or near flux to produce each individual accent color, pellets, or granules. Various compounding equipment, such as a Banbury, extruder, continuous or ribbon mixer, are all suitable for the process. This manufacturing process provides a wider operation latitude for how the pellets and/or granules can be produced. The basic objective is to flux or near flux the materials into one homogeneous color mass and then reduce the particle size into a more desirable size for the subsequent operations. The accent pellet can be produced by either a single or twin screw extruder with a strand die having various shapes, e.g. cylindrical or sphere or platelet. The extrudate is then cut into pellets using an underwater pelletizer. The preferred accent chips size is less than 1 inch, most preferred is from ¼" in length. The most preferred processing temperature for the accents is from about 280° F. to 340° F. Color pigments or color concentrates can be use at any level to yield a desirable color for the accent.

A mixture of accent colors pellets/chips, as referred to herein, is prepared, for instance, by physically blending each individual accent color at a specific wt % ratio based on desired visual or aesthetics via either a conical or radial mixer or a tumble blender, or other method to provide a uniform mixture of multi-color accent pellets. The range of wt % of the individual accent pellets that make up the total of all accent pellets can be from 3-50 wt % or other wt % can be used to yield a desirable visual.

The process for making the base color can be similar or essentially the same to the process described for the accent color pellets. Once again, the components are combined in a heated mixer or compounding equipment and brought to a flux or near flux. Different compounding equipment, such as a Banbury, extruder, continuous or ribbon mixer and the like, can be used. The charging order of the raw material components can vary. A preferred processing temperature for the base can be from about 280° F. to about 340° F. Color pigments or color concentrates can be use at any level to yield desirable color for the base.

The method for creating the variegated visual with the base and accent color pellets using the composition can be achieved by the method as illustrated in FIG. 1. FIG. 1 shows a schematic process flow for making a non-PVC resilient floor covering with variegated visual. Both the base pellets (a) and a mixture of accent pellets/chips (b) as shown in FIG. 1 can be made via any process (including conventional processes) as discussed earlier; and thus are not included in FIG. 1. The mixture of accent colors pellets/chips (b) as shown in FIG. 1 comprises a blend of each individual accent color pellets at a determined ratio for target visual as discussed above. The process for producing variegated chips can be processed into 2 different paths. Path A, as shown in FIG. 1, is where a mixture of multi-colors accent pellets (b) is fed into the last zone of an either a twin or single screw extruder and merged with the base (a) extrudate as it exits from the extruder. Path B, as shown in FIG. 1, is where a mixture of multi-colors accent pellets (b) is fed onto the base (a) extrudate as it exits the extruder and just before entering into the nip of either a mill or calendar rolls.

After combining the two streams of the melted base (a) and the accent color chips (b) by either Path A or Path B, the combination enters the calendar or mill nip, and this leads to an intermixing of the colors and results in a striated or marbleized visual of a multi-color sheet (c). The mill or calendar gap opening, as well as the draw ratio, can be controlled by varying the speed of the rolls between the nip in order to control the degree of intermixing or variegation. The temperature of the base stream and accent color pellets can also influence the level of intermixing and can be controlled for consistent intermixing and process consistency. The processing temperature for the base in the extruder can be from 280° F. to 340° F. (or temperatures above or below this range), and the mill gap can be from about 60 to about 120 mil (or gap settings above or below this range), and the differential roll speed between the nip rolls can be about 2:1 adjust roll (back roll): fixed roll (front roll) (±25% on the ratio). A preferred roll temperature is from about 80° F. to 110° F. for back roll and about 150° F. to 210° F. for the front roll. Other temperature and roll ratios can be used.

In the process shown in FIG. 1, the striated or marbleized (c) material is subsequently size reduced. The number of size reductions steps and sizes of chips are not limited. First, striated or marbleized sheet (c) is broken into chips by any size reduction method, such as a granulator, e.g. Size Reduction #1. The variegated chips (d) can be less than ⅝" in size. The larger chips sizes are then put through an additional size reduction step, e.g., Size Reduction # 2, using a smaller screen size than the size reduction (#1). Other screen sizes can work. Optionally, large variegated chips sizes (e) can also go through another size reduction (f) step. Cooling may also be a desired step in order to minimize the potential of chips sintering together or blocking and to maximize the size reduction process.

Suitable screens are used, e.g. classification # 1 and classification # 2 in FIG. 1 to select desired particle size ranges during the size reduction process. A proper size of chips is segregated from the material being size reduced. The ranges of this size are utilized for creating and controlling consistency of the desired product visual. A desirable particle size for the variegated chips (d) and (e) for flooring applications is less than 10 mesh in size. The over-sized chip (e), e.g. greater 10 mesh, can be looped back to the machine for further size reductions to less than 10 mesh, or optionally, it can be captured for an additional size reduction (f) with a different type of size reduction equipment than the size reduction # 1 and 2, e.g., hammer mill or an attrition-type of size reduction unit, that can be operated at ambient or cryogenic conditions so that it can be more effective in producing very fine particle size chips or granules. The desirable chip size for achieving variegated visual is less than 10 mesh. However, larger than 10 mesh particles can be used by scattering these on the top of the finer particles having a size of less than 10 mesh in product construction, but its visual will look different from the chips that are less than 10 mesh. Compositionally, the material with different particle sizes is all the same and would constitute a homogeneous product.

In sheet forming process (g), the variegated chips or granules (d) and (e) or (d) and optionally (f) are dispensed onto a moving belt using an appropriate powder lay down coater. The lay down coaters provide adequate and uniform lay down in order to produce a finished nominal 2 mm thick product. Obviously, a different caliper of the product could be produced as desired.

Product formation can be achieved by a sintering process or heating step (such as an IR oven) of the chips or granules that have been dispensed onto a belt. A sufficiently hot, nominal surface temperature can be achieved, such as in the range from 350° F.-400° F., and then compressing the material (e.g., using a consolidation, calendaring, or embossing roll) into a formed sheet. The uniqueness of the process as shown in this invention is that it allows a lower degree of stretch, thus providing a finished product with less machine directional pattern elongation, which is a desirable visual attribute. The sheet is then cooled sufficiently to peel the formed sheet off of the carrier belt. Next, the sheet receives a top coating(s) of urethane to enhance the stain, scuff and scratch resistance of the product. The material is then cooled, wrapped up in roll form, either as a jumbo roll to be later inspected and cut into smaller packed rolls or a packed rolls directly, or can also be cut into a tile format with desirable sizes. These packed sheet rolls or tiles would ultimately be for use as a surface covering product.

Other product visuals could include a product made from a single color or a simple blend of individual colors. Yet, another structure could be one in which the variegated layer might be combined with a different product structure i.e. it could be bonded to a substrate layer and serve as the décor visual used to make a heterogeneous type product. That heterogeneous product could exploit the desired visual, plus provide added product features such as the ability to easier install or handle.

In another aspect, a heterogeneous construction is provided that is defined as multiple distinctively layered sheets in the thickness dimension of the construction, such as the above-described surface covering, including a substrate backing comprised of the olefin composition as described herein, a printed décor layer, and optionally one or more wear and scratch-resistant coatings. The surface coloring or decorating elements generally need not extend through the entire thickness of the floor coverings, but may be present on one single layer in the construction.

Any conventional step can be used to make a surface or floor covering, such as a laminated sheet, tile or plank, which includes the olefin based composition exemplified herein.

The sheet containing the composition of the present invention, as described above, can be used as a backing layer to form a laminated surface or floor covering. Along with this backing layer, a décor layer and one or more wear layers as previously described can be used to form the laminated structure. Any conventional method for making the décor layer or the wear layer can be used. Additional layers can be added to this structure in any combination.

For example, a laminated floor covering having various layers as described in U.S. Pat. Nos. 6,291,078; 6,228,463; 6,218,001; 6,114,008; 5,961,903; 5,955,521; and 5,494,707, which are all incorporated by reference in their entireties herein, can be modified with the present invention. Any methods of providing the design, the embossing, and/or the various layers can be used, such as described in U.S. Pat. Nos. 6,986,934; 6,555,216; 5,961,903; and 5,494,707, which are all incorporated by reference in their entireties herein.

The top surface of the backing layer can be treated with a corona treatment, heat or plasma treatment, sanding, or any combination thereof. A polyurethane hot melt adhesive can be applied to the bottom surface of the décor layer. The bottom surface of the décor layer with the polyurethane hot melt adhesive can then be affixed to the top surface of the treated backing layer. Optionally, the wear resistant layer can be cured with electron beam or radiation.

Certainly, for purposes of the present invention, additional layers not specifically mentioned above, can be used, such as, one or more reinforcement layers, pre-coat layers, additional intermediate or laminate layers, and/or additional backing layers which can be the same or different. In each case, each layer can be affixed in some manner such as by casting, adhesive, or other means conventional in the art. Multiple layers for wear resistant resilient coverings are described in U.S. Pat. Nos. 3,870,591; 5,494,707; and 6,555,216, which are incorporated by reference herein in their entireties.

For purposes of the present invention, any embodiment can contain more than one type of layer, e.g., more than one pre-coat layer, more than one laminate layer, and so on. Any combination is possible. In addition, blowing agents, catalyst, fillers, surface-active additives, flame retardants, anti-microbial agents, and other conventional ingredients can also be present in any of the layers.

Various coatings or layers are discussed previously and below, and unless stated otherwise, are preferably of a substantially uniform thickness and can be applied using techniques known to those skilled in the art. The preparation of the composition for each layer can be by any technique known in the art. For example, the preparation of the composition for the hot melt laminate layer can be accomplished with a variety of mixing techniques. Preferably, the compositions of the laminate layer, or any layer, are produced by compounding in a hot-melt mixer, using a batch process. The compositions can then be stored at an elevated temperature until needed. Alternatively, the compositions can be produced in a continuous mixing process and/or using a compounding extruder. The compositions produced by this process can be applied directly to the coating line. They can also be cooled and pelletized until needed. The pellets can be reheated prior to application or stored in a molten state until needed.

The sequence of forming any of the various layers is not critical to the present invention. Production of the tiles or laminated structure can include the intermediate steps of forming one or more laminate strata by joining two or more constituent layers together. Furthermore, one or more of the layers may be formed "upside down" relative to the orientation of the finished product as a floor covering. Thus, directional references are merely given for the purpose of aiding the reader and are not intended in any way to limit the scope of the present invention.

In each case, the individual layers described above, are affixed in some manner such as by casting, extruding, and/or laminating the various layers on a previously formed layer, or by other means conventional in the art. As an alternative to using the backing layer as the substrate on which all other layers are applied, it is certainly within the bounds of the present invention to form any layer of the surface covering first and then add other desirable layers to the top and/or bottom surface of the first layer formed.

The construction of the laminated surface covering according to the present invention provides flexibility for varying the amount of fillers. This provides a variety of possible flexural modulus and impact balance. The result is excellent performance and low maintenance, especially for flooring applications. For flooring applications, other desirable properties attained by using the composition or laminated structure according to the present invention include attractive visual, excellent stain resistance, excellent scratch resistance, no or little polish maintenance. Additionally, it is a better alternative and environmental friendlier than the existing conventional PVC based flooring products.

Where the composition of the present invention is used as a stand alone product, better performance such as excellent stain, heat and light resistance and resistance to crack and high static load are obtained, as compared to those of the conventional vinyl composition tiles. Such products according to the present invention are also desirable in that they contain no halogens.

The composition according to the present invention allows for a surface covering, that can be laminated and can have excellent performance as a floor covering. The construction of these laminates provide the flooring with attractive visual, excellent stain, scratch resistance and/or low maintenance, e.g., no wax/no polish maintenance. Although illustrated for use in surface and floor coverings, the olefin based composition illustrated herein also can be formed into and used in combination with other materials in other useful articles.

The present invention includes the following aspects/embodiments/features in any order and/or in any combination:

1. The present invention relates to a composition for a surface covering or portion thereof comprising:
   A) at least one ethylene propylene copolymer having a MFR of from 0.5 to 15 g/10 min., obtainable by Ziegler Natta sequential polymerization, where the total content of copolymerized ethylene is from about 20 to about 60 wt %, having a melting point of from about 140° C. to about 160° C., a flexural modulus of from about 20 Mpa to about 500 Mpa and a density from 0.870 to 0.900 g/cm$^3$,
   B) at least one thermoplastic bio-resin derived from starch or soy or both, optionally having a softening temperature of about 125° C., and/or a melting temperature of about 156° C., and/or a density of about 1.12 to 1.3 g/cm$^3$, and/or a melt flow rate of about 0.5 to about 2.0 g/10 min.,
   C) at least one compatibilizer made from functionalizing polyolefin with at least one polar group of carboxylic acid, maleic anhydride, acrylic acid, ethylene methacrylic acid, or methyl acrylate, where the polar group is present in the range of from about 0.1 to about 10 wt % of the polyolefin (based on the total weight of the composition), and the polyolefin having an isotactic index of from about 85% to about 95% and the functionalizing polyolefin having a MFR range from about 100-450 g/10 min,
   D) at least one styrenic thermoplastic block copolymer of styrene/ethylene/butylene or styrene/ethylene/propylene where the polystyrene content in the block copolymer is from about 7 to about 30%, and the block copolymer having a melt flow rate of from 2.5 to 25 g/10 min.,
   E) at least one filler, and
   F) at least one dispersion agent made from isotactic polypropylene homopolymer by either free radical degradation in peroxide or an isotactic polypropylene homopolymer made by single site catalyst polymerization, having an isotactic index greater than 80 and a melt flow rate (MFR) from about 1000 to about 2000 g/10 min., at 230° F. and 2.16 kg according to ASTM D1238, and, optionally, at least one hydrocarbon tackifier comprising a blend of an aliphatic hydrocarbon resin, an aromatic hydrocarbon polymer functionalized with fatty acid ester having a softening temperature at from about 103° C. to 113° C., and, optionally, at least one ethylene octene copolymer produced by single site catalyst polymerization and having a MFR from about 3 to about 30 g/10 min., a melting temperature from about 60° C. to 90° C. and a density from about 0.860 to about 0.902 g/cm$^3$, wherein the ethylene octene copolymer is optionally in part or a whole replacement of component (A).

2. The composition of any preceding or following embodiment/feature/aspect, wherein rate of heat release of the composition as measured by ASTM E1354 is from 200 to 340 kW/m$^2$.

3. The composition of any preceding or following embodiment/feature/aspect, wherein smoke generation of the composition as measured by ASTM E1354 is from 250 to 350 m$^2$/Kg.

4. The composition of any preceding or following embodiment/feature/aspect, wherein carbon mono-oxide yield of the composition as measured by ASTM E1354 is from 0.086 to 0.250.

5. The composition of any preceding or following embodiment/feature/aspect, wherein tear strength of the composition as measured by ASTM D1938-94 is greater than or equal to 8 lbf/in.

6. The composition of any preceding or following embodiment/feature/aspect, wherein the thermoplastic bio-resin derived from starch is produced from corn, wheat, potatoes, or grass.

7. The composition of any preceding or following embodiment/feature/aspect, wherein the thermoplastic bio-resin derived from starch is produced from non-genetically modified cornstarch.

8. The composition of any preceding or following embodiment/feature/aspect, wherein the thermoplastic bio-resin derived from non-genetically modified cornstarch comprises 65-95 w % plant starch, 1-15 w % reactive plasticizer 9. The composition of any preceding or following embodiment/feature/aspect, wherein the thermoplastic bio-resin derived from starch has a melting temperature of about 300° F.-315° F.

10. The composition of any preceding or following embodiment/feature/aspect, wherein the thermoplastic bio-resin derived from starch has a softening temperature of about 250° F.-260° F.

11. The composition of any preceding or following embodiment/feature/aspect, wherein the first polyolefin comprises 3-10 carbon atoms.

12. The composition of any preceding or following embodiment/feature/aspect, further comprising a thermoplastic that is different from any thermoplastic present in said composition.

13. The composition of any preceding or following embodiment/feature/aspect, further comprising a flame retardant.

14. The composition of any preceding or following embodiment/feature/aspect, wherein said polar group is present in an amount of from about 0.5 wt % to about 5 wt %, based on the total weight of the composition.

15. The composition of any preceding or following embodiment/feature/aspect, wherein the hydrocarbon tackifier is present and comprises at least one aliphatic hydrocarbon resin, at least one aromatic hydrocarbon resin, and at least one fatty acid ester compound.

16. The composition of any preceding or following embodiment/feature/aspect, wherein the hydrocarbon tackifier is present in an amount of from about 0.1 wt % to about 5 wt %, based on the total weight of the composition.

17. The composition of any preceding or following embodiment/feature/aspect, wherein said dispersion agent is present in an amount of from about 0.1 wt % to about 5 wt %, based on the total weight of the composition.

18. The composition of any preceding or following embodiment/feature/aspect, wherein the filler comprises talc, mica, calcium carbonate, barite, kaolin, silica, glass, or any combination thereof.
19. The composition of any preceding or following embodiment/feature/aspect, wherein the filler is present in an amount of from about 50 wt % to about 90 wt %, based on the total weight of the composition.
20. The composition of any preceding or following embodiment/feature/aspect, further comprising at least one additive comprising a pigment, flame retardant, thermal stabilizer, antimicrobial, biocide, light stabilizer, antistatic, or any combination thereof.
21. The composition of any preceding or following embodiment/feature/aspect, wherein at least one component is a recycled material.
22. The composition of any preceding or following embodiment/feature/aspect, wherein the recycled material comprises polyolefin, polyethylene, polypropylene, ethylene propylene, olefin copolymers, carpet comprising an olefin backing with nylon faced yarn, carpet comprising olefin backing with olefin faced yarn, glass beads, fly ash, gypsum or any combination thereof.
23. A flooring covering comprising the composition of any preceding or following embodiment/feature/aspect.
24. The flooring covering of any preceding or following embodiment/feature/aspect, wherein the composition is in the form of multiple-colored and/or variable-sized chips.
25. The floor covering of any preceding or following embodiment/feature/aspect, wherein the floor covering is in the form of a sheet, a tile or a plank.
26. The floor covering of any preceding or following embodiment/feature/aspect, wherein the floor covering is in the form of a sheet, a tile or a plank.
27. A laminated surface covering comprising:
    a backing layer comprising the composition of claim 1, wherein the backing layer has a top surface and a bottom surface,
    a décor layer having a top surface and a bottom surface, wherein the bottom surface of the décor layer is affixed to the top surface of the backing layer, and
    at least one wear layer having a top surface and a bottom surface, wherein the bottom surface of the wear resistant layer is affixed to the top surface of the décor layer.
28. The laminated surface covering of any preceding or following embodiment/feature/aspect, wherein the at least one wear layer comprises an unsaturated functional acrylate and aluminum oxide particles.
29. The laminated surface covering of any preceding or following embodiment/feature/aspect, wherein the at least one wear layer is directly on the top surface of the décor layer and is cured by electron beam or radiation.
30. The laminated surface covering of any preceding or following embodiment/feature/aspect, wherein the décor layer comprises a gravure print, a digital print, a flexo print, a transfer print, a pad print, a stamping print, a decorative painting, or any combination thereof.
31. The laminated surface covering of any preceding or following embodiment/feature/aspect, wherein the décor layer comprises a substrate, and wherein the substrate comprises a plastic film and/or paper.
32. The laminated surface covering of any preceding or following embodiment/feature/aspect, wherein the plastic film comprises a non-poly vinyl chloride plastic film.
33. The laminated surface covering of any preceding or following embodiment/feature/aspect, wherein the bottom surface of the décor layer is affixed to the top surface of the backing layer by hot melt, moisture cure polyurethane glue.
34. The laminated surface covering of any preceding or following embodiment/feature/aspect, wherein the unsaturated functional acrylate comprises an epoxy oligomer, urethane oligomer, polyester oligomer, or any combination thereof.
35. The laminated surface covering of any preceding or following embodiment/feature/aspect, wherein the at least one wear layer comprises a reactive monomer, wherein the reactive monomer comprises a mono-functional diluent, a di-functional diluent, a multi-functional diluent, or any combination thereof.
36. The laminated surface covering of any preceding or following embodiment/feature/aspect, wherein the at least one wear layer comprises at least one surfactant, at least one defoaming agent, at least one abrasive resistant particle, or any combination thereof, and optionally at least one photoinitiator.
37. The laminated surface covering of any preceding or following embodiment/feature/aspect, further comprising at least one additional layer, wherein the additional layer comprises an olefin blend, a glass mat, a thermoplastic film, or any combination thereof.
38. A method of making the composition of any preceding or following embodiment/feature/aspect, comprising mixing components of the composition or extruding the composition in a twin screw, a single screw, a banbury mixer, an extruder with a slot die, or any combination thereof.
39. The composition of any preceding or following embodiment/feature/aspect, wherein said composition is halogen-free.
40. The floor covering comprising the composition of any preceding or following embodiment/feature/aspect.
41. A laminated surface covering comprising:
    a backing layer comprising the composition of any preceding or following embodiment/feature/aspect, wherein the backing layer has a top surface and a bottom surface,
    a décor layer having a top surface and a bottom surface, wherein the bottom surface of the décor layer is affixed to the top surface of the backing layer, and
    at least one wear layer having a top surface and a bottom surface, wherein the bottom surface of the wear resistant layer is affixed to the top surface of the décor layer.

The present invention can include any combination of these various features or embodiments above and/or below as set forth in sentences and/or paragraphs. Any combination of disclosed features herein is considered part of the present invention and no limitation is intended with respect to combinable features.

Table A summarizes the testing conducted for samples and comparatives samples as shown in all Figures.

TABLE A

| Performance Properties | Test Method |
| --- | --- |
| Static load Indentation @ 500 psi., mil or $1/1000''$ of indent depth | ASTM F970-00 |
| Static load Indentation @ 750 psi., mil or $1/1000''$ of indent depth | ASTM F970-00 |

TABLE A-continued

| Performance Properties | Test Method |
| --- | --- |
| Static load Indentation @ 2000 psi; mil or 1/1000" of indent depth | ASTM F970-00 |
| Trouser tear @ 5"/min., Lbf of tear/linear inch | ASTM D1938-94 |
| Elongation @break (cross head speed 2"/min.), % | ASTM D-638-97 |
| Tensile strength @ break (cross head speed 2"/min.), psi | ASTM D-638-97 |
| Tensile Modulus (cross head speed 2"/min.), psi | ASTM D-638-97 |
| Residual indent (15 min. w/75 lbs - ¼" indent foot), report - mil or 1/1000" of indent depth after 1 hour recovery | ASTM F-1914-98 |
| Abrasion (Taber abrader w/H-18 wheel, 1000 cycles, 1000 gr. load), report thickness loss, 1/1000" or mil. and/or weight loss due to wear | ASTM F510-93 |
| Laminated Floor - Taber Abrasion Wear Resistance, report number cycles to wear thru wear layer to print visual Teledyne Taber S-42 | NALFA - LF01-2003, 3.8 |
| Taber stiffness, Taber Unit number for stiffness | ASTM D474-02 |
| Smoke Density - Both Flaming and Non-Flaming mode, Watts/cm2 | ASTM E662 |
| Critical Radian Flux, Watts/cm2 | ASTM E648 |
| Cone Calorimeter - Heat & Visible Smoke Release Rates | ASTM E-1354 |
| Heat Stability, Del E | ASTM F1514-03 |
| Light Stability, Del E | ASTM F1515-03 |
| Water absorption, w % gain after 24 hrs. immersion | Mannington M107 |
| Water growth, % change in dimension - Mannington M206 | Mannington M206 |
| Impact - Small ball impact test, 1" ball dia., Height: 20", W = 65 grs.) | ASTM F1265-90 |
| Can drop Indent - Reported drop height and indentation, mil. or 1/1000" | Mannington M018 |
| Indent (1 min. w/30 lbs.) (cone foot) - mil or 1/1000" of indent depth | ASTM F-1914 |

EXAMPLES

Example 1

In this example, blends of ethylene propylene copolymer with an un-modified natural corn starch and a non-genetically modified thermoplastic starch polymer (non-GMO-TPS) are illustrated in Table 1. All components were dried blended and fed into a W&P co-rotating twin screw extruder with all zones set at 200° C., ran at 40 RPM speed follow by sheet forming on a 2-roll calendar with front and back roll temperatures set 300° F. and roll speed at 40 RPM. Sheet thickness target at 80 mil. from the calendar roll were examined for surface texture, color and appearance. The result shows that the blending of an ethylene propylene copolymer with a natural corn starch or un-modified corn powder—Control formula 2 is not as good as when the natural corn starch had modified into a thermoplastic starch (TPS) such as the one in Control formula 1—Table 1. However, even blending of an ethylene propylene copolymer with a thermoplastic starch as in Control formula 1, the compatibility is still not as good as in Sample 1A when a functionalized polyolefin such as that of ethylene-propylene-grafted-maleic anhydride was used as a compatibilizer for the ethylene propylene copolymer and TPS blend. This enhancement in compatibility when a compatibilizer was used can be explained base on the fact that ethylene propylene copolymer is a non-polar polymer while TPS is polar polymer—a polysaccharide derived from alpha-glucose and thus contains polar groups such as the hydroxyl —OH groups. The polar group, such as that of acid or anhydride modified polyolefin, acts as a compatibilizer by providing inter-molecular bonding between the TPS and the ethylene propylene copolymer via polar—polar interaction and/or hydrogen bonding.

The enhancing in compatibility is observed in a better and more uniform blend, and thus better properties of the olefin/TPS when functionalized polyolefin is added as a compatibilizer as shown in Example 2—Table 2.

Example 2

In order to evaluate the melt rheological property and processing characteristics of the TPS and olefin blend, additional compositions were prepared and were run on a lab scale Babender plasticorder where the mixing temperature, mixing time, and mixing energy were monitored. All components were dry blended and fed into the Brabender mixer where the stock temperature was set at 350° F. or ~177° C. for melt processing. After melting and mixing, sheets at 80 mil thick was formed in a carver press set at 300° F. and 30 seconds dwell time and physical properties were tested and are shown in Table 2. Sample 2B in Table 2 is a blend of an ethylene propylene copolymer with a lower TPS content and a higher lever of compatibilizer than Sample 1A in Table 1. The effect of compatibilizer is clearly demonstrated in Sample 2B which yielded far better tear strength and resistance to indentation than the Control Formula 4 where there is no compatiblizer, and even exceeds, e.g., tear strength, that of the Control Formula 5, which is 100% ethylene propylene copolymer, thus showing a synergetic effect when blend 2B contained a compatibilizer. In addition to the enhancement in properties, this invention also discovered that when replacing a portion of the petroleum base polymer with a bio-base polymer, such as that of a non-GMO-thermoplastic starch used in the invention, as shown in Table 2, the resulting blend such as Sample 2B has a lower heat release rate, lower smoke generation and carbon mono-oxide yield than the 100% petroleum base polymer as tested by ASTM E-1354 using cone calorimeter and a 25 kW/m² heat flux source. The lower smoke generation, heat release rate and carbon mono-oxide yield are much more environmentally preferred as compared to a higher smoke, heat release rate and carbon mono-oxide gas release of the petroleum base polymer when burned. The lower smoke generation, heat release rate and carbon mono-oxide gas of the olefin/TPS blend is a result of the unique burn characteristics of the non-GMO-thermoplastic starch used in this invention, which shows to have a lower heat release, lower smoke production rate, and, most importantly, a significantly lower yield of carbon mono-oxide than the petroleum base copolymer (Control formula 6 vs. Control Formula 5). Carbon mono-oxide is a toxic gas generated during burning and is responsible for many fire-related deaths. As shown in this invention, the blending of a petroleum base polymer with a renewable base polymer not only yielded desirable performance properties that are suitable for a surface covering, such as a sheet with good tear and indentation resistance, but also reduced the consumption of the natural gas used to make the petroleum base polymer, such as polyolefin, and also reduced the smoke generation and carbon mono-oxide gas; thus overall minimizing the damages due to the environment. The sustainability of the composition suitable for the surface covering as disclosed in this invention is further illustrated in Example 3—Table 3.

Example 3

Thus far, Examples 1 and 2 show blends of olefin copolymer with non-GMO-thermoplastic starch and no filler. Example 3—Table 3 illustrates Sample 1C with a high lever of filler and an example of an alpha-olefin copolymer, such as an ethylene-octene copolymer, instead of an ethylene propylene copolymer. The ethylene-propylene-grafted-maleic anhydride was used as a compatibilizer for the TPS and the olefin as well as a compatibilizer and/or coupling agent for the filler with the olefin matrix in Sample 1C, whereas the aromatic and aliphatic hydrocarbon modified with acid functionality helped as a tackifier for the calendaring process for sheet forming. Sample 1C and Control Formula 7 were run on the Brabender plasticorder at similar processing conditions as for Sample 2B and Control Formulas 4, 5, and 6 in Example 2, and the energy consumption was recorded by the plastogram. As shown in Table 3, the enhancement in breaking strength, stiffness and indentation resistance of the sheet made from Sample 1C as compared to the Control formula 7 were clearly due to the replacement in part of the olefin copolymer by that of the TPS. Furthermore, it was discovered by this invention that the replacement in part of the olefin or petroleum base polymer with a renewable or bio-base polymer—TPS also resulted in a very desirable energy saving on processing of the blend. As shown in Table 3, the data from the plastogram of the plasticorder showed that despite of the fact the TPS has a much higher melting point than the olefin copolymer used in this example, 156° C. vs. 64° C. in Sample 1C, the blend melted or mixed at a lower temperature, for a shorter time, and at a lower total energy consumption required for melting and mixing the conventional product. This indicates that in addition to the enhancements in some key performance properties suitable for the surface covering and reducing the harmful smoke or carbon mono-oxide gas as shown in Example 2, the specific blend of TPS with olefin as disclosed in this invention can be processed with lower energy consumption than a petroleum base blend; thus making this a very environmentally preferred composition. The sustainable and environmental friendly composition for surface covering as disclosed in this invention is also shown to be far more favorable than PVC as illustrated in Example 4.

Example 4

In this example, Sample 1D has a lower TPS and filler content than Sample 2D, and Sample 2D and Control Formula 8 in Table 4 are similar to that of Sample 1C and Control formula 7 in Table 3. Similar to Example 2, sheets made from the blends of TPS and olefin polymer as shown in Table 4, especially for a sample with higher content of non-GMO-thermoplastic starch (2D with 15 wt % TPS vs. 1D with 10 wt % TPS), had a significantly lower smoke generation rate and carbon mono-oxide yield than the Control Formula 8 of olefin with no TPS or Control Formula 9 with PVC. PVC is well known for its inherent flame retardant and low heat release but high smoke release rate due to the heavy chlorine atom. In contrast, olefin is well known for low smoke release but high heat release when burned. The unique fire performance or burn characteristics of Sample 2D which is a blend of TPS, olefin, and filler as shown in this invention clearly have very low smoke release rate and carbon mono-oxide gas release characteristics to that of the non-GMO-thermoplastic starch used this invention. In addition, the olefin/TPS/filler blend disclosed in this invention, e.g., Example 2D, also had low heat release rate characteristics to that of the PVC, without the need for a flame retardant that most olefins would need to reduce the flame or heat release rate.

Example 5

Samples 1E and 2E in Table 5 demonstrated various blends with higher wt % of non-GMO-thermoplastic starch than Examples 2B, 1C, 1D or 2D which yielded different sheet properties that can be obtained from this invention as non-limited examples. Sheets for Samples in Table 5 were made at similar processing conditions as described in Example 1. The role of the functionalized polyolefin as a compatibilizer continued to show enhancement in the performance properties when compared to Samples 1E and 2E to the Control Formula 10, where better tear strength and resistance to indentation are illustrated. Example 2E shows even a more desirable balance, e.g., lower Taber stiffness number, better indentation resistance, and higher tear resistance than Sample 1E and Control Formula 10 when a styrene thermoplastic elastomer, such as styrene-ethylene-butylene-styrene linear tri-block copolymer, was used in combination with the an alpha-olefin such as that of ethylene-octene copolymer. Sample 2E also showed no significant adverse effects on indentation resistance as compared to Sample 1E as one would expect when adding a soft thermoplastic elastomer. In contrast, the addition of this styrenic thermoplastic elastomer helped to increase the tear strength and a more flexible sheet than Sample 1E, e.g., lower tensile modulus and taber stiffness numbers. The soft and rubbery segment of the ethylene-butylene combined with the hard segment of the styrene in the styrene-ethylene-butylene-styrene linear block copolymer obtained desirable balance for a flexible sheet with good indentation resistance.

It is clear that there are finite fire performance differences among Samples 1E and 2E as shown in Table 5 as compared to Control Formula 8—olefin without TPS and Control Formula 9—PVC in Table 4 based on the cone calorimeter measurements. The lower heat release rate, smoke generation, and carbon mono-oxide gas release of Samples 1E and 2E are environmentally favorable and are sustainable characteristics for making these useful compositions for surface covering applications as shown in this invention.

Example 6

As a non-limited example, Samples 1F and 2F were prepared at different compositions than previous Examples, where a post-consumer glass bead and a non-halogenated flame retardant may also be used in the blend of TPS and olefin that is suitable for surface covering applications (Table 6). Preparation of the Samples 1F and 2F were made on a 2-roll calendar with the temperature set at 375° F. for melting, mixing and sheet forming at 80 mil. thickness, followed by chip processing using a Cumberland granulator with screen size 1/16" to obtain thru 12 mesh chips. Finally, chips were consolidated by heating up the chips in the oven at 400° F. for 7 min, then pressed in a cold press for 4 min. at 75 tons pressure to form a sheet at 80 mil thick. The physical properties of the sheet made from the chips consolidation are shown in FIG. 6 and compared to that of PVC—Control Formula 9. As shown, although at a much higher total filler or total inorganic content than PVC, e.g. 50-63 wt % vs. 47 wt %, Samples 1F and 2F had a lower product weight and superior tear and indentation resistance as compared to the PVC—Control Formula 9. In addition to performance properties enhancement, Samples 1F and 2F were also far more environmental friendly than the PVC composition, where they not only contained no halogenated compound, no plasticizer, no heavy metal stabilizers but did contain renewable and recycled components. The lower product weight for same sheet thickness especially that of sample 2F as compared to Control Formula 9 resulted in lower transportation and fuel cost and consequently a lower Life Cycle Cost and thus had a positive impact on the environment.

Example 7 & Example 8

As non-limited examples, Samples 1G and 2G were prepared at different compositions, but the process for making the consolidated sheets for property testing were similar to that of Samples 1F and 2F as described in Example 6. Samples of olefin/TPS blends and PVC all exceeded the required critical radian flux of ≥0.45 w/cm² for Class I—commercial surface covering (Table 7), but the olefin composition as shown in this invention also had a much lower smoke generation than the comparative PVC sample in both flaming and non-flaming modes (Table 8).

Example 9

As non-limited examples, Samples 1I was prepared at different compositions where the blend of olefin and TPS contains even a much higher filler or total inorganic content than previous Examples, e.g., greater than 65 wt %. Sample 1I was made following similar processing as described in Examples 6, 7, and 8, e.g., tile or sheet made from chips consolidation. As shown in Table 9, Sample 1I—a blend of olefin/TPS/filler had better performance properties than the Control Formula 1I—PVC, e.g. better crack resistance, indentation resistance, wear resistance and water resistance. Another advantage of Sample 1I was superior crack resistance at cold temperature as compared to Control Formula 1I—PVC. In addition to better performance properties, Sample 1I was also very environmental friendly where it contains no-halogenated compound, no plasticizer, or heavy metal stabilizer, unlike PVC; it also contains renewable, e.g., non-GMO-thermoplastic starch, and recycled, e.g., post consumer glass bead, components.

Example 10

As non-limited examples, Samples 1J which is an olefin/TPS/filler blend was prepared and tested for heat and light resistance properties. As shown in Table 10, the yellow index or Delta E of Sample 1J of this invention which contained no heat or light stabilizers had much better heat and light resistance as indicated by much lower Delta E values as compared to that of the Control Formula 9 of PVC where it contains ~2 wt % of heat and light stabilizer, which normally contained metal, e.g., zinc based compounds.

Example 11

Several laminate structures were prepared according to this invention by incorporating a highly filled polyolefin based layer or layer(s) with a décor layer and a coating layer via a conventional lamination technique for surface covering production. The olefin based layer used for the laminate structure for this investigation was made similar to the blend formulation of Sample 1C of Example 3. It will be appreciated that other sample formulations of this invention, such as Samples 1E, 2E, 1G, 2G, or 1I, etc., also could be used. Olefin based compositions formed into various thicknesses and/or layers with a composition varied within the scope of the compositional claims according to this invention can be used. Using olefin based sheets made according to embodiments of this invention, a number of laminate structures A-J were made, which are described in more detail below. Sample 1K as shown in Table 11 representing an embodiment of the present invention was a laminate of structure J as described below.

A. An 85 mil. thick olefin sheet (i) was adhered to a 0.005" pre-printed cellulose paper (ii) and 0.004" thick radiation cured coating system (iii) as described above. Various commercial grades of high abrasive decorated and coated layers are available in the marketplace such as one supplied by DTS-Systemoberflachen in Germany with the product names of ELESGO™ or supplied by W.K.P. in Germany. The top surface of the olefin base (i) can be affixed to decorated layers (ii) and the cured multiple coated (iii) by any means, such as with an adhesive, a primer, a corona treated or plasma treated or any combination thereof. Preferably the adhesive is a hot melt, moisture cured polyurethane.

B. A fiberglass scrim was sandwiched between two 40 mils thick olefin sheets with heat and pressure, the inter-medium laminate (i) was then adhered to a pre-printed cellulose paper (ii) and a thick radiation cured coating system (iii) as described above. Various commercial grades of high abrasive decorated and coated layers are available in the marketplace such as one supplied by DTS-Systemoberflachen in Germany with the product names of ELESGO™ or supplied by W.K.P. in Germany. The cured multiple coated and decorated layers can be affixed to the top surface of the olefin based substrate by any means, such as with an adhesive. Preferably the adhesive is a hot melt, moisture cured PU glue.

C. Structure C was identical to structure B but contained two fiberglass scrims.

D. An 85 mils thick olefin sheet (i) was adhered to a 0.010" thick back printed, acrylic film (ii) with an UV curing urethane coating (iii). The film is commercially available from CFC International, e.g. NEOCLAD ECR34110™. The adhesive used was a hot melt, moisture cured polyurethane adhesive.

E. This structure was similar to that of (i) in B with a fiberglass scrim; the printing layer (ii) and coating system (iii) was similar to that in D.

F. Structure of F was similar to D and E where the 2nd high wear resistance UV cure coating system was applied on top of the first urethane coating.

G. Structure of G was similar to that of D and E with the exception of replacing the UV cured urethane coating with a high clarity and high performance SURLYN™ ionomer film, or polypropylene film or polyethylene film or film made from a blending thereof, or a polyester film. The top layer was adhered to the printed layer by any means either by surface treating the printed visual or the back of the high clarity film by corona discharge or by plasma or by hot melt adhesive, adhesive, or primer or combination thereof. Various thicknesses can be used.

H. Structure of H was similar to A and B except in place of printed visual (ii) and high performance EB cured coating system (iii), the top of the olefin base (i) was adhered to a 0.003" pre-printed urethane. The urethane can optionally have another high performance coating on top.

I. Structure of I was similar to that of A and B, except in place of printed visual (ii) and high performance EB cured coating system (iii), the olefin backing (i) was adhered to a multi-layer structure where such multi-layer structure consisted of (from top to bottom order): a) a 0.003" thick high performance, high clarity ionomer film, b) a 0.005" thick of pre-pigmented ionomer film, c) a 0.002" thick of polyolefin tie-layer, d) a 0.005" up to 0.015" thick thermoplastic polyolefin (TPO) where all layers (a) thru (d) were made by a co-extrusion process. Such a product is available from A-Schulman under the trade name INVISION™. Such a pre-pigmented multi-layer structure has a very unique visual, such as metallic and marble, and very good UV and wear performance. The above said multi-layer structure can be adhered to the olefin base (i) by either heat or compression, or an olefin based adhesive.

J. Structure of J consisted (from top to bottom order): (a) a high performance polyolefin alloy film which is a proprietary product made by O'Sullivan. The polyolefin alloy wear layer (a) comprises at least one polyolefin of a copolymer or elastomeric polymer, a homopolymer, a copolymer, blend of copolymers or blend of elastomeric polymers, and/or combination thereof. The polyolefin alloy (a) can also comprise additives such as stabilizers, lubricant, fillers, anti-static, anti-microbial, clarifier agent, flame retardant and/or combination thereof. The polyolefin alloy wear layer (a) is halogen and phthalate ester free. This wear layer (a) creates a durable wear layer with low haze and good scuff and mar properties. This olefin alloy has a melting point range between 100 to 160° C. It has excellent rheological properties for processing including calendaring, extruding, laminating and pressing. In laminate structure J, the wear layer (a) was adhered to another olefin printed layer (b) by any means either by surface treating the printed visual or the back of the olefin alloy wear layer by corona discharge or by plasma or by hot melt adhesive, or adhesive or by applying a primer or by heat and pressure or any combination thereof. The bottom of the olefin printed layer (b) is adhered to the olefin substrate (c) without the need for any adhesive due to the good compatibility of the olefin substrate (c) to the olefin printed layer (b) used in this invention. The olefin substrate layer (c) was made with a composition similar to the olefin backing (i) as described in all laminate structures of A thru I or composition within the scope and claims of this invention. Subsequently, the olefin substrate (c) was adhered to a bottom layer (d) (requiring no adhesive) and the bottom layer (d) acted as a balancing layer as well as a layer that provided good adhesion with various glues used for surface covering installation. Bottom layer (d) is also a polyolefin and it may or may not contain a surface coating. Bottom layer (d) may or may not have the same composition as of any of the layer (a), (b), or (c). Bottom layer (d) is a non halogenated compound. Optionally, bottom layer (d) can also contain fillers, additives such as flame retardant, antimicrobial, natural organic and inorganic fibers, etc. For laminate structure J various thicknesses for each of the layer can be used. Optionally, wear layer (a) in structure J can also have an UV cured urethane coating as a top coat. Optionally, balancing layer can also have a primer for enhancing bonding with an installation adhesive For illustration purposes, some outstanding performance characteristics observed for Sample 1K comprising a laminate structure J as described above was made according to an embodiment of this invention, and are shown in Table 11, and also those of a Comparative Sample A (representative of structures comprising a multi-layer structure laminate made from a PVC where the structure also contained a high PVC performance wear layer and a high performance urethane UV cured coating); Comparative Sample B (representative of structures comprising a multi-layer structure laminate made from olefin polymer where the structure contained a high performance wear layer made of ionomer with no urethane coating); and Comparative Sample C (representative of structures similar to Comparative Sample B comprising a multi-layer structure laminate made from olefin where the structure contained a high performance wear layer made of ionomer and also with a high performance urethane UV cured coating). The olefin laminate of Sample 1J made according to an embodiment of this invention had an overall favorable performance properties including outstanding indentation resistance, scratch resistance and wear resistance as compared to Comparative Examples A, B, and C. Floor coverings made from the laminate of Sample 1J required no waxing and no stripping, and thus, is a low maintenance floor covering. Yet another feature of the laminate structure 1J is significantly much lighter than Comparative Sample B-PVC. The lower product weight will result in lower transportation and fuel cost and thus has a positive impact on the environment and Life Cycle Cost.

TABLE 1

| Materials, in wt % | Control formula 1 | 1A | Control formula 2 | Control formula 3 |
|---|---|---|---|---|
| Non-Genetically Modified Thermoplastic starch polymer (non-GMO-TPS) - Tm = 156° C., T Soft = 125° C. | 37 | 35.5 | | |
| Ethylene Propylene copolymer | 63 | 61 | 63 | 61 |
| Ethylene-Propylene-grafted-Maleic anhydride | | 3.5 | | 3.5 |
| Natural corn starch (un-modified corn starch) | | | 37 | 35.5 |
| Total | 100 | 100 | 100 | 100 |
| Note on sheet formation | Blend shows incompatibility as evident by surface texture, roughness and marbleized flow line or non-uniform dispersion of starch | Ethylene propylene grafted Maleic anhydride copolymer acted as a compatibilizer which yielded better sheet with smoothness, and more uniform surface than control formula 1 | Control formula 2 is the same as control formula 1 but used powder starch or natural - unmodified starch instead of thermoplastic starch polymer. Sheet showed incompatibility as shown with surface roughness, texture and un-melting starch powder. Slightly yellowing | Addition of Ethylene propylene grafted Maleic anhydride copolymer as a compatibilizer into control formula 2 improved compatibility but still not as good as in Sample 1A when using thermoplastic starch. Non-uniform dispersion of |

TABLE 1-continued

| Materials, in wt % | Control formula 1 | 1A | Control formula 2 | Control formula 3 |
|---|---|---|---|---|
| | | | indicated degradation of starch. Water vapor created via extruder vent indicated a high moisture uptake in natural starch as compared to thermoplastic starch used in sample 1A | natural un-modified starch still evident in the sheet |

TABLE 2

| | Control formula 4 | 2B | Control formula 5 | Control formula 6 |
|---|---|---|---|---|
| Materials, in wt % | | | | |
| Non-Genetically Modified Thermoplastic starch polymer (non-GMO-TPS) - Tm = 156° C., Tsoft = 125° C. | 20 | 20 | | 100 |
| Ethylene Propylene copolymer Tm = 145° C. | 80 | 75 | 100 | |
| Ethylene-Propylene-grafted-Maleic anhydride (MFR = 450 g/10 min. @ 190° C./2.16 Kg) | | 5 | | |
| Total | 100 | 100 | 100 | 100 |
| Performance Properties | | | | |
| Elongation @break (cross head speed 2"/min., dog bones), % | 308 | 288 | 434 | 8 |
| Tensile Modulus (cross head speed 2"/min., dog bones), psi | 13988 | 15040 | 7427 | 182851 |
| Tensile strength @ break (cross head speed 2"/min., dog bones), lbf | 1505 | 1501 | 2010 | 898 |
| Trouser tear, lbf/in. | 19 | 35 | 29 | 5 |
| Residual Indent @ 75 lb for 15 minutes/one hour recovery, mil or 1/1000" | 4.9 | 1.5 | 9.6 | 0.7 |
| Cone Calorimeter Using 25 kW/m² Heat Flux | | | | |
| Rate of heat release, kW/m² | 643 | 685 | 725 | 334 |
| Specific Extinction area for smoke or smoke generation, m²/kg | 470 | 475 | 544 | 196 |
| CO, Carbon monoxide yield, | 0.332 | 0.364 | 0.431 | 0.062 |

TABLE 3

| | 1C | Control Formula 7 |
|---|---|---|
| Materials, in wt % | | |
| Non-Genetically Modified Thermoplastic starch polymer (non-GMO-TPS) - Tm = 156° C., Tsoft = 125° C. | 15 | |
| Ethylene/Octene copolymer, Tm = 64° C., MFR = 5.0, 70 shore A | 17 | 32 |
| Polypropylene homopolymer (MFR = 1800 g/10 min.) | 1 | 1 |
| Aromatic & aliphatic hydrocarbon polymer modified with acid | 1 | 1 |
| Ethylene-Propylene-grafted-Maleic anhydride (MFR = 450 g/10 min.@ 190° C./2.16 Kg) | 1 | 1 |
| Calcium carbonate | 65 | 65 |
| Total | 100 | 100 |
| Plasto-Corder (Brabender) | | |
| Stock temperature set at, ° F. | 350 | 350 |
| Actual Stock temperature at fluxing, ° F. | 336 | 354 |
| Minimum energy required for fluxing (melting & Mixing), kNm | 4.4 | 9.6 |
| Minimum time required for fluxing (melting & Mixing), min: seconds | 1 min. 14 sec | 2 min. 52 sec |
| Maximum energy from loading to complete mixing, kNm | 5.5 | 11.7 |
| Maximum time required for complete mixing, min: seconds | 1 min. 38 sec | 3 min. 30 sec. |
| Performance Properties | | |
| Break load (cross head speed 2"/min., dog bone) | 22 | 14 |
| Tensile strength @ break (cross head speed 2"/min., dog bones), psi | 1114 | 703 |
| Tensile Modulus (cross head speed 2"/min., dog bones) | 117267 | 15094 |
| Residual Indent @ 75 lb and 15 minutes/one hour recovery, mil. or 1/1000" | 0.8 | 3 |

TABLE 4

| | 1D | 2D | Control Formula 8 | Control Formula 9 |
|---|---|---|---|---|
| Materials, in wt % | | | | |
| Non-Genetically Modified Thermoplastic starch polymer (non-GMO-TPS) - Tm = 156° C., Tsoft = 125° C. | 10 | 15 | | |
| Ethylene/Octene copolymer, Tm = 64° C., MFR = 5.0, 70 shore A | 35 | 17 | 32 | 34 wt % of PVC+ |
| Polypropylene homopolymer (MFR = 1800 g/10 min.) | | 1 | 1 | |
| Aromantic & aliphatic hydrocarbon polymer modified with acid | | 1 | 1 | 17 wt % Plastiti- cizer+ |
| Ethylene-Propylene-grafted- Maleic anhydride (MFR = 450 @ 190° C./2.16 Kg) | 5 | 1 | 1 | ~2 wt % Heat & light stabilizers |
| Calcium carbonate, fine particles (Vicron 15-15) | 50 | 65 | 65 | 47 |
| Total | 100 | 100 | 100 | 100 |
| Cone Calorimeter Using 25 KW/m² heat Flux | | | | |
| Rate of heat release, kW/m² | 336 | 216 | 556 | 206 |
| Specific Extinction Area (SEA) for smoke or smoke generation, m²/kg | 512 | 272 | 539 | 726 |
| CO, Carbon mono-oxide yield, | 0.296 | 0.086 | 0.430 | 0.440 |

TABLE 5

| | Control Formula 10 | 1E | 2E |
|---|---|---|---|
| Materials, in wt % | | | |
| Non-Genetically Modified Thermoplastic starch polymer (non-GMO-TPS) - Tm = 156° C., Tsoft = 125° C. | 25 | 25 | 25 |
| Ethylene/Octene copolymer, Tm = 64° C., MFR = 5.0, 70 shore A | 25 | 22 | 17 |
| Styrene-Ethylene-Butylene- Styrene, Kraton MD6945M, shore A, S/Rubber = 13/87 | | | 5 |
| Ethylene-Propylene-grafted- Maleic anhydride (MFR = 450 @ 190° C./2.16 Kg) | | 1 | 1 |
| Aromantic & aliphatic hydrocarbon polymer modified with acid | | 1 | 1 |
| Polypropylene homopolymer (MFR = 1800 g/10 min.) | | 1 | 1 |
| Calcium carbonate, fine particles (Vicron 15-15) | 50 | 50 | 50 |
| Total | 100 | 100 | 100 |
| Performance Properties | | | |
| Trouser Tear, lbf | 13 | 16 | 20 |
| Tensile strength @ break (cross head speed 2"/min., dog bones), psi | 749 | 943 | 771 |
| Elongation @break (cross head speed 2"/min., dog bones), % | 46 | 13 | 21 |
| Tensile Modulus (cross head speed 2"/min., dog bones), psi | 35490 | 51194 | 47527 |
| Taber Stiffness, (Taber Unit numbers) | 970 | 1505 | 1280 |
| Residual Indent @ 75 lb for 15 minutes/one hour recovery, mil or ¹⁄₁₀₀₀" | 3.1 | 2.2 | 2.7 |
| Static load @ 500 psi, indent after 24 hr recovery, mil. or ¹⁄₁₀₀₀" | 2.5 | 0.8 | 0.8 |
| Static load @ 750 psi, indent after 24 hr recovery, mil. or ¹⁄₁₀₀₀" | 2.5 | 1.5 | 1.7 |
| Cone Calorimeter Using 25 KW/m² heat Flux | | | |
| Rate of heat release, kW/m² | 266 | 312 | 332 |
| Specific Extinction Area (SEA) for smoke or smoke generation, m²/kg | 175 | 279 | 339 |
| CO, Carbon mono-oxide yield, Kg/Kg | 0.106 | 0.150 | 0.163 |

TABLE 6

| | 1F | 2F | Control Formula 9 |
|---|---|---|---|
| Materials, in wt % | | | |
| Non-Genetically Modified Thermoplastic starch polymer (non-GMO-TPS) - Tm = 156° C., Tsoft = 125° C. | 5 | 5 | No renewable content |
| Ethylene/Octene copolymer, Tm = 64° C., MFR = 5.0, 70 shore A | 18 | | |
| Styrene-Ethylene-Butylene- Styrene, Kraton MD6945M, | 10 | 10 | |
| Ethylene Propylene co- polymer Tm = 145° C. | | 31 | 34 wt % of PVC+ |
| Magnesium Hydroxide | 20 | 20 | |
| Polypropylene homopolymer (MFR = 1800 g/10 min.) | 1 | 1 | 17 wt % Plastiti- cizer+ |
| Ethylene-Propylene-grafted- Maleic anhydride (MFR = 450 @ 190° C./2.16 Kg) | 2 | 2 | |
| Aromantic & aliphatic hydrocarbon polymer modified with acid | 1 | 1 | ~2 wt % Heat & light stabilizers |
| Post consumer glass bead 200 mesh | 12 | 10 | No post consumer content |
| Calcium carbonate, fine particles (Vicron 15-15) | 31 | 20 | 47 |
| Total | 100 | 100 | 100 |
| Performance Properties | | | |
| Product Weight @ ~80 mil. thickness, lb/sq. Yard | 5.0 | 4.68 | 5.78 |
| Trouser Tear, lbf./in. | 13 | 20 | 9 |
| Static load @ 500 psi, 24 hr. recovery, mil. Or ¹⁄₁₀₀₀" | 1.5 | 0.9 | 1.9 |
| Static load @ 750 psi, 24 hr recovery, mil or ¹⁄₁₀₀₀" | 2 | 1.5 | 2.6 |
| Taber Stiffness | 390 | 490 | 440 |
| Abrasion (Taber abrader w/H-18 wheel, 1000 cycles, 1000 gr. load), millage loss due to wear | 5 | 4.4 | 4.0 |

TABLE 7

|  | 1G | 2G | Control Formula 9 |
|---|---|---|---|
| Materials, in wt % | | | |
| Non-Genetically Modified Thermoplastic starch polymer (non-GMO-TPS) - Tm = 156° C., Tsoft = 125° C. | 5 | 12 | No renewable content |
| Ethylene/Octene copolymer, Tm = 64° C., MFR = 5.0, 70 shore A | 16 | 21 | 34 wt % of PVC + |
| Styrene-Ethylene-Butylene-Styrene, Kraton MD6945M, | 10 | 8 | |
| Magnesium Hydroxide | 20 | 25 | |
| Polypropylene homopolymer (MFR = 1800 g/10 min.) | 1 | 1 | 17 wt % Plastiticizer+ |
| Ethylene-Propylene-grafted-Maleic anhydride (MFR = 450 @ 190° C./2.16 Kg) | 2 | 2 | |
| Aromantic & aliphatic hydrocarbon polymer modified with acid | 1 | 1 | ~2 wt % Heat & light stabilizers |
| Post consumer glass bead 200 mesh | 10 | | No post consumer content |
| Calcium carbonate, fine particles (Vicron 15-15) | 35 | 30 | 47 |
| Total | 100 | 100 | 100 |
| ASTM E648 | | | |
| Charred (Length, cm) | 37.5 | 6.4 | 35 |
| Total Burn Length (cm) | 37.5 | 6.4 | 31 |
| Critical Radiant Flux (w/cm²) | 0.55 | >1.080 | 0.67 |
| Visual Observation on Burn Characteristics | The PVC material produced significantly more smoke than Samples 1G and 2G of this invention. The PVC material also produced black smoke vs. white smoke as produced by samples 1G & 2G. The PVC material also produced more intense flame than Sample 1G and 2G | | |

TABLE 8

|  | 1H | Control Formula 9 |
|---|---|---|
| Materials, in wt % | | |
| Non-Genetically Modified Thermoplastic starch polymer (non-GMO-TPS) - Tm = 156° C., Tsoft = 125° C. | 12 | No renewable content |
| Ethylene/Octene copolymer, Tm = 64° C., MFR = 5.0, 70 shore A | 21 | 34 wt % of PVC+ |
| Styrene-Ethylene-Butylene-Styrene, Kraton MD6945M, | 8 | |
| Magnesium Hydroxide | 25 | |
| Polypropylene homopolymer (MFR = 1800 g/10 min.) | 1 | 17 wt % Plastiticizer+ |
| Ethylene-Propylene-grafted-Maleic anhydride (MFR = 450 @ 190° C./2.16 Kg) | 2 | |
| Aromantic & aliphatic hydrocarbon polymer modified with acid | 1 | ~2 wt % Heat & light stabilizers |
| Post consumer glass bead 200 mesh | | No post consumer content |
| Calcium carbonate, fine particles (Vicron 15-15) | 30 | 47 |
| Total | 100 | 100 |
| ASTM E662 - Non Flaming Mode | | |
| Corrected Max. Specific Optical Density, $D_M$ | 407 | 659.3 |
| Specific Optical Density, Ds @ 1.5 Min. | 0.315 | 5.225 |
| Specific Optical Density, Ds @ 4 Min. | 34.21 | 216.6 |
| ASTM E662 - Flaming Mode | | |
| Corrected Max. Specific Optical Density, $D_M$ | 116.6 | 291.3 |
| Specific Optical Density, Ds @ 1.5 Min. | 0.62 | 47.26 |
| Specific Optical Density, Ds @ 4 Min. | 0.7 | 178.9 |

TABLE 9

|  | 1I | Control Formula 11 |
|---|---|---|
| Materials, in wt % | | |
| Non-Generic Modified Thermoplastic starch polymer - Tm = 156° C., Tsoft = 125° C. | 5 | No renewable content |
| Ethylene Propylene copolymer Tm = 145° C. | 9 | 12% PVC copolymer |
| Post consumer glass bead at 200 mesh particle sizes from Dlubak | 5 | No post consumer filler |
| Ethylene propylene random copolymer, MFR = 7, Tm = @ 230° C. | 3 | |
| Polypropylene homopolymer (MFR = 1800 g/10 min.) | 1 | |
| Ethylene-Propylene-grafted-Maleic anhydride (MFR = 450 @ 190° C./2.16 Kg) | 1 | ~5 wt % plasticizer+ |
| Aromantic & aliphatic hydrocarbon polymer modified with acid | 1 | Heat Stabilizer |
| Calcium carbonate (limestone) - untreated | 75 | 83% calcium carbonate |
| Total | 100 | 100 |
| Properties of Homogeneous Tile | | |
| Static load Indentation @ 750 psi; mil or 1/1000" of indent depth | 0.8 | 2 |
| Note of visual after indentation: break or crack | No crack | no crack |
| Static load Indentation @ 2000 psi; mil or 1/1000" of indent depth | 1 | 2 |
| Note of visual after indentation: break or crack | no crack | no crack |
| Impact - Small ball impact test, 1" ball dia., Height: 20", W = 65 grs.) Fail if cracks propagated beyond 3" circles (a total of 8 drops) | Pass No crack | Pass crack w/ in 3" |
| Elongation @break (cross head speed 2"/min., 1" × 4" strip) | 1.90 | 1.21 |

TABLE 9-continued

|  | 1I | Control Formula 11 |
|---|---|---|
| Tensile strength @ break (cross head speed 2"/min., 1" × 4" strip) | 1031 | 913 |
| Tensile Modulus (cross head speed 2"/min., 1" × 4" strip) | 78764 | 138310 |
| Indent (mils) (1 min. w/30 lbs. conical foot) | 3.5 | 7 |
| Abrasion (Taber abrader w/H-18 wheel, 1000 cycles, 1000 gr. load), millage loss due to wear | 5.8 | 9 |
| Abrasion (Taber abrader w/H-18 wheel, 1000 cycles, 1000 gr. load), weight loss, grs. | 0.9 | 1.4 |
| Water 24 hrs. submerging - weight gained, 3 pc × 6" × 6", (final W − initial W/init. W) *100, % | 0.053 | 0.30 |
| Water growth, no dir - 5 pcs - (2" × 9") submerged 7 days, (final L − init L/init. L) *100, % | 0.01 | 0.10 |

TABLE 9-continued

|  | 1I | Control Formula 11 |
|---|---|---|
| Can drop at ambient, indent depth mils or 1/1000" | | |
| 15" ht., Indent depth, mil. or 1/1000" | 8 | 6 |
| 30" ht., Indent depth, mil. or 1/1000" | 10 | 8 |
| 45" ht., Indent depth, mil. or 1/1000" | 10 | 10 |
| Can drop at cold (after 48 hrs. exposed at 35° F.) | | |
| 15" ht., Indent depth, mil. or 1/1000" | 7 | 4 |
| 30" ht., Indent depth, mil. or 1/1000" | 11 | 6 |
| 45" ht., Indent depth, mil. or 1/1000" | 14 (no crack) | sample broke |

TABLE 10

| Heat & Light Stability | 1J * | Control formula 9 ** |
|---|---|---|
| Heat Stability (ASTM F 1514-03) | | |
| Low heat @ 150° F. for 3 weeks (Delta E) | 1.86 | 3.31 |
| Light Stability (ASTM F1515-03) | | |
| Weatherometer, Xenon @ 400 hours (Plus exposed at 150° F./4 hrs.) (Delta E) | 1.01 | 24.68 |
| Indoor Light | | |
| HPUV (to simulate indoor fluorescent light) for 2 weeks, plus exposed at 150° F. @ 4 hrs., Delta E | 0.27 | 1.65 |

* no heat or light stabilizer added
** 2 wt % of heat & light stabilizer

TABLE 11

| Performance Properties | 1K | Comparative Sample A | Comparative Sample B | Comparative Sample C |
|---|---|---|---|---|
| Wear layer thickness & Type | 15 mil. - olefin | 20 mil. - PVC | 32 mil. - Ionomer | 12 mil. - Ionomer |
| Total product thickness | 2.0 mm (80 mil.) | 2.5 mm (100 mil.) | 2.5 mm (100 mil.) | 2.0 mm (80 mil.) |
| Product Weight, Lb/Sq. Yard | 5.2 | 7.9 | 5.7 | 6.0 |
| Abrasion (Taber abrader), cycles - NAFLA - LF01-2003, 3.7 | 6,600 | 6,500 | 5,600 | 3,200 |
| Static load Indentation (@ 750 psi), mil or 1/1000" | 0.8 | 1 | 4 | 0.5 |
| Static load Indentation (@ 2000 psi), mil. or 1/1000" | 1.2 | 2 | 5.5 | 1.0 |
| Rolling load, 265 lbs. polyurethane wheel, cycles to wear | 6000 cycles | 6000 cycles | 3000 cycles - stop test | 2500 cycles |
| Rolling load, 265 lbs. polyurethane wheel, thickness loss in mil. or 1/1000" due to wear and/or indent | 6 mil - no tracking | 25 mil. - tracking shown | 8 mil. - no tracking | 14 mil. - wear thru |

Rolling load is a test method adapted from Castor Chair EN 425. Mannington modified test method M 272.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present teachings will be apparent to those skilled in the art from consideration of the specification and practice of the present teachings disclosed herein. It is intended that the specification and examples be considered as exemplary only, with the true scope and spirit of the present invention being indicated by the following claims and equivalents thereof.

What is claimed is:

1. A composition for a surface covering or portion thereof comprising:
   A) at least one ethylene propylene copolymer having a melt flow rate of from 0.5 to 15 g/10 min., obtainable by Ziegler Natta sequential polymerization, where the total content of copolymerized ethylene is from about 20 to about 60 wt %, having a melting point of from about 140° C. to about 160° C., a flexural modulus of from about 20 Mpa to about 500 Mpa and a density from 0.870 to 0.900 g/cm³,
   (B) at least one thermoplastic bio-resin derived from starch or soy or both, optionally having a softening temperature of about 125° C., and/or a melting temperature of about 156° C., and/or a density of about 1.12 to 1.3 g/cm³, and/or a melt flow rate of about 0.5 to about 2.0 g/10 min.,
   (C) at least one compatibilizer made from functionalizing polyolefin with at least one polar group of carboxylic acid, maleic anhydride, acrylic acid, ethylene methacrylic acid, or methyl acrylate, where the polar group is present in the range of from about 0.1 to about 10 wt % of the polyolefin (based on the total weight of the composition), and the polyolefin having an isotactic index of from about 85% to about 95% and the functionalizing polyolefin having a melt flow rate range from about 100-450 g/10 min,
   (D) at least one styrenic thermoplastic block copolymer of styrene/ethylene/butylene or styrene/ethylene/propylene where the polystyrene content in the block copolymer is from about 7 to about 30%, and the block copolymer having a melt flow rate of from 2.5 to 25 g/10 min.,
   (E) at least one filler, and
   (F) at least one dispersion agent made from isotactic polypropylene homopolymer by either free radical degradation in peroxide or an isotactic polypropylene homopolymer made by single site catalyst polymerization, having an isotactic index greater than 80 and a melt flow rate (melt flow rate) from about 1000 to about 2000 g/10 min., at 230° F. and 2.16 kg according to ASTM D1238, and, optionally, at least one hydrocarbon tackifier comprising a blend of an aliphatic hydrocarbon resin, an aromatic hydrocarbon polymer functionalized with fatty acid ester having a softening temperature at from about 103° C. to 113° C., and, optionally, at least one ethylene octene copolymer produced by single site catalyst polymerization and having a melt flow rate from about 3 to about 30 g/10 min., a melting temperature from about 60° C. to 90° C. and a density from about 0.860 to about 0.902 g/cm³, wherein the ethylene octene copolymer is optionally in part or a whole replacement of component (A).

2. The composition of claim 1, wherein rate of heat release of the composition as measured by ASTM E1354 is from 200 to 340 kW/m².

3. The composition of claim 1, wherein smoke generation of the composition as measured by ASTM E1354 is from 250 to 350 m²/Kg.

4. The composition of claim 1, wherein carbon monoxide yield of the composition as measured by ASTM E1354 is from 0.086 to 0.250.

5. The composition of claim 1, wherein tear strength of the composition as measured by ASTM D1938-94 is greater than or equal to 8 lbf/in.

6. The composition of claim 1, wherein the thermoplastic bio-resin derived from starch is produced from corn, wheat, potatoes, or grass.

7. The composition of claim 1, wherein the thermoplastic bio-resin derived from starch is produced from non-genetically modified cornstarch.

8. The composition of claim 7, wherein the thermoplastic bio-resin derived from non-genetically modified cornstarch comprises 65-95 w % plant starch, 1-15 w % reactive plasticizer.

9. The composition of claim 1, wherein the thermoplastic bio-resin derived from starch has a melting temperature of about 300° F.-315° F.

10. The composition of claim 1, wherein the thermoplastic bio-resin derived from starch has a softening temperature of about 250° F.-260° F.

11. The composition of claim 1, wherein the first polyolefin comprises 3-10 carbon atoms.

12. The composition of claim 1, further comprising a thermoplastic that is different from any thermoplastic present in said composition.

13. The composition of claim 1, further comprising a flame retardant.

14. The composition of claim 1, wherein said polar group is present in an amount of from about 0.5 wt % to about 5 wt %, based on the total weight of the composition.

15. The composition of claim 1, wherein the hydrocarbon tackifier is present and comprises at least one aliphatic hydrocarbon resin, at least one aromatic hydrocarbon resin, and at least one fatty acid ester compound.

16. The composition of claim 1, wherein the hydrocarbon tackifier is present in an amount of from about 0.1 wt % to about 5 wt %, based on the total weight of the composition.

17. The composition of claim 1, wherein said dispersion agent is present in an amount of from about 0.1 wt % to about 5 wt %, based on the total weight of the composition.

18. The composition of claim 1, wherein the filler comprises talc, mica, calcium carbonate, barite, kaolin, silica, glass, or any combination thereof.

19. The composition of claim 1, wherein the filler is present in an amount of from about 50 wt % to about 90 wt %, based on the total weight of the composition.

20. The composition of claim 1, further comprising at least one additive comprising a pigment, flame retardant, thermal stabilizer, antimicrobial, biocide, light stabilizer, antistatic, or any combination thereof.

21. The composition of claim 1, wherein at least one component is a recycled material.

22. The composition of claim 21, wherein the recycled material comprises polyolefin, polyethylene, polypropylene, ethylene propylene, olefin copolymers, carpet comprising an olefin backing with nylon faced yarn, carpet comprising olefin backing with olefin faced yarn, glass beads, fly ash, gypsum or any combination thereof.

23. A flooring covering comprising the composition of claim 1.

24. The flooring covering of claim 23, wherein the composition is in the form of multiple-colored and/or variable-sized chips.

25. The floor covering of claim 23, wherein the floor covering is in the form of a sheet, a tile or a plank.

26. The floor covering of claim 24, wherein the floor covering is in the form of a sheet, a tile or a plank.

27. A laminated surface covering comprising:
   a backing layer comprising the composition of claim 1, wherein the backing layer has a top surface and a bottom surface,
   a décor layer having a top surface and a bottom surface, wherein the bottom surface of the décor layer is affixed to the top surface of the backing layer, and at least one wear layer having a top surface and a bottom surface, wherein the bottom surface of the wear resistant layer is affixed to the top surface of the décor layer.

28. The laminated surface covering of claim 27, wherein the at least one wear layer comprises an unsaturated functional acrylate and aluminum oxide particles.

29. The laminated surface covering of claim 27, wherein the at least one wear layer is directly on the top surface of the décor layer and is cured by electron beam or radiation.

30. The laminated surface covering of claim 27, wherein the décor layer comprises a gravure print, a digital print, a flexo print, a transfer print, a pad print, a stamping print, a decorative painting, or any combination thereof.

31. The laminated surface covering of claim 27, wherein the décor layer comprises a substrate, and wherein the substrate comprises a plastic film and/or paper.

32. The laminated surface covering of claim 31, wherein the plastic film comprises a non-poly vinyl chloride plastic film.

33. The laminated surface covering of claim 27, wherein the bottom surface of the décor layer is affixed to the top surface of the backing layer by hot melt, moisture cure polyurethane glue.

34. The laminated surface covering of claim 28, wherein the unsaturated functional acrylate comprises an epoxy oligomer, urethane oligomer, polyester oligomer, or any combination thereof.

35. The laminated surface covering of claim 27, wherein the at least one wear layer comprises a reactive monomer, wherein the reactive monomer comprises a mono-functional diluent, a di-functional diluent, a multi-functional diluent, or any combination thereof.

36. The laminated surface covering of claim 27, wherein the at least one wear layer comprises at least one surfactant, at least one defoaming agent, at least one abrasive resistant particle, or any combination thereof, and optionally at least one photoinitiator.

37. The laminated surface covering of claim 27, further comprising at least one additional layer, wherein the additional layer comprises an olefin blend, a glass mat, a thermoplastic film, or any combination thereof.

38. A method of making the composition of claim 1, comprising mixing components of the composition or extruding the composition in a twin screw, a single screw, a banbury mixer, an extruder with a slot die, or any combination thereof.

39. The composition of claim 1, wherein said composition is halogen-free.

40. The floor covering comprising the composition of claim 39.

41. A laminated surface covering comprising:
a backing layer comprising the composition of claim 39, wherein the backing layer has a top surface and a bottom surface,
a décor layer having a top surface and a bottom surface, wherein the bottom surface of the décor layer is affixed to the top surface of the backing layer, and
at least one wear layer having a top surface and a bottom surface, wherein the bottom surface of the wear resistant layer is affixed to the top surface of the décor layer.

* * * * *